(12) United States Patent
Gafford et al.

(10) Patent No.: US 12,533,016 B2
(45) Date of Patent: Jan. 27, 2026

(54) METHOD AND APPARATUS FOR ENDOSCOPY

(71) Applicant: EndoTheia, Inc., Nashville, TN (US)

(72) Inventors: Joshua Gafford, Nashville, TN (US);
Jake Childs, Kingston, TN (US);
Laura Davis, San Ramon, CA (US);
Daniel Caleb Rucker, Knoxville, TN (US); Patrick Anderson, Nashville, TN (US); Robert Webster, Nashville, TN (US); Scott Webster, Nashville, TN (US)

(73) Assignee: EndoTheia, Inc., Nashville, TN (US)

( * ) Notice: Subject to any disclaimer, the term of this patent is extended or adjusted under 35 U.S.C. 154(b) by 260 days.

(21) Appl. No.: 18/238,194

(22) Filed: Aug. 25, 2023

(65) Prior Publication Data
US 2024/0138659 A1    May 2, 2024

Related U.S. Application Data

(60) Provisional application No. 63/419,836, filed on Oct. 27, 2022.

(51) Int. Cl.
*A61B 1/005* (2006.01)
*A61B 1/00* (2006.01)
(Continued)

(52) U.S. Cl.
CPC ........ *A61B 1/0055* (2013.01); *A61B 1/00029* (2013.01); *A61B 1/00101* (2013.01);
(Continued)

(58) Field of Classification Search
CPC .... A61B 1/0055; A61B 1/0056; A61B 1/0057
See application file for complete search history.

(56) References Cited

U.S. PATENT DOCUMENTS 3,802,440 A * 4/1974 Salem ............... A61M 16/0429
  138/120
4,353,358 A * 10/1982 Emerson ................ A61B 1/31
  600/146

(Continued)

FOREIGN PATENT DOCUMENTS

WO    2009127236 A1    10/2009

OTHER PUBLICATIONS

International Search Report and Written Opinion issued in related Application Serial No. PCT/US2023/072920 on Dec. 12, 2023.

*Primary Examiner* — Colin T. Sakamoto
(74) *Attorney, Agent, or Firm* — Holland & Knight LLP; Matthew C. Cox; Forrest S. Tinnin

(57) ABSTRACT

The present disclosure provides an endoscopic apparatus and associated methods. The apparatus may include a steerable tool having a first flexible tube concentrically nested within a second flexible tube. The apparatus may include an end cap disposed on the steerable tool, an image sensor disposed on the end cap, and one or more light sources disposed on the end cap. The apparatus may be configured for accessing a region within a middle ear cavity of a patient. As such, the apparatus may further include a flexible tube, through which the steerable tool may extend, as well as a pre-curved rigid tube, through which the flexible tube may extend, thus allowing the apparatus to be deployed for middle ear access.

18 Claims, 33 Drawing Sheets

(51) Int. Cl.
*A61B 1/045* (2006.01)
*A61B 1/05* (2006.01)
*A61B 1/06* (2006.01)
*A61B 1/227* (2006.01)
*A61M 25/00* (2006.01)
*A61M 25/01* (2006.01)

(52) U.S. Cl.
CPC .......... *A61B 1/0052* (2013.01); *A61B 1/0057* (2013.01); *A61B 1/045* (2013.01); *A61B 1/053* (2013.01); *A61B 1/0655* (2022.02); *A61B 1/0676* (2013.01); *A61B 1/227* (2013.01); *A61M 2025/0004* (2013.01); *A61M 25/0138* (2013.01); *A61M 25/0152* (2013.01)

(56) References Cited

U.S. PATENT DOCUMENTS

| | | | | |
|---|---|---|---|---|
| 5,437,288 A * | 8/1995 | Schwartz | ............... | A61M 25/09 604/528 |
| 5,746,701 A * | 5/1998 | Noone | ................... | A61M 25/09 600/585 |
| 6,802,835 B2 * | 10/2004 | Rabiner | ............ | A61M 25/0067 604/528 |
| 9,265,407 B2 * | 2/2016 | Goldfarb | ............ | A61B 1/00154 |
| 9,782,566 B1 * | 10/2017 | Paprocki | ............ | A61F 2/042 |
| 2005/0240147 A1 * | 10/2005 | Makower | ............ | A61B 18/042 623/1.11 |
| 2006/0063973 A1 * | 3/2006 | Makower | ............ | A61B 17/282 600/114 |
| 2006/0095066 A1 * | 5/2006 | Chang | ............ | A61B 17/12136 606/199 |
| 2006/0241564 A1 * | 10/2006 | Corcoran | .......... | A61M 25/0147 604/523 |
| 2007/0185384 A1 * | 8/2007 | Bayer | ................ | A61B 1/00177 600/129 |
| 2007/0269385 A1 * | 11/2007 | Yun | ........................ | A61M 25/10 514/253.08 |
| 2009/0163890 A1 * | 6/2009 | Clifford | ............ | A61M 25/0068 606/162 |
| 2010/0198191 A1 * | 8/2010 | Clifford | .................... | A61B 8/12 600/249 |
| 2010/0274188 A1 * | 10/2010 | Chang | ...................... | A61B 8/12 606/167 |
| 2010/0305697 A1 * | 12/2010 | Clifford | ................ | A61F 2/2476 623/10 |
| 2012/0245593 A1 * | 9/2012 | Mandpe | ................ | A61F 11/202 606/109 |
| 2012/0253357 A1 * | 10/2012 | Mandpe | ................ | A61F 11/202 606/109 |
| 2012/0289772 A1 * | 11/2012 | O'Connell | ............. | A61B 34/20 128/200.24 |
| 2013/0226026 A1 * | 8/2013 | Dillard | .................... | A61B 10/02 604/174 |
| 2013/0303968 A1 * | 11/2013 | Clifford | ............. | H01S 5/06256 604/8 |
| 2013/0304034 A1 * | 11/2013 | Cabiri | ............... | A61M 25/0138 604/528 |
| 2014/0276051 A1 * | 9/2014 | Hoffman | ............ | A61B 17/3417 604/164.09 |
| 2015/0202089 A1 * | 7/2015 | Campbell | ............... | A61B 5/411 600/478 |
| 2016/0310701 A1 * | 10/2016 | Pai | ...................... | A61B 18/1492 |
| 2018/0126122 A1 * | 5/2018 | Cabiri | ............. | A61M 25/0138 |
| 2020/0121166 A1 | 4/2020 | Thissen | | |
| 2021/0290039 A1 * | 9/2021 | Sekowski | ............ | A61B 1/0052 |
| 2024/0138865 A1 * | 5/2024 | Gafford | ................ | A61B 17/221 |
| 2024/0197341 A1 * | 6/2024 | Webster, III | ............. | A61B 1/05 |
| 2024/0407772 A1 * | 12/2024 | Gafford | ............. | A61M 25/0138 |
| 2024/0423795 A1 * | 12/2024 | Sun | ................... | A61M 25/0147 |

\* cited by examiner

METHOD AND APPARATUS FOR ENDOSCOPY

CROSS-REFERENCE TO RELATED APPLICATIONS

This application is a non-provisional application and claims priority to U.S. Provisional Patent Application No. 63/419,836, filed Oct. 27, 2022, entitled METHOD AND APPARATUS FOR OTOLOGIC ENDOSCOPY, which is hereby incorporated by reference in its entirety.

STATEMENT REGARDING FEDERALLY SPONSORED RESEARCH OR DEVELOPMENT

This invention was made with government support under grant number 1R44DC019894 awarded by the National Institutes of Health (NIH). The government has certain rights in the invention.

BACKGROUND

The present disclosure relates generally to apparatuses and methods for endoscopic surgery and/or diagnosis, and more particularly to deploying endoscopic devices for accessing the middle ear cavity (or a region within the middle ear cavity, specifically) of a patient non-surgically.

Each year approximately 16.4 million people suffer from diseases of the middle ear in the United States, with many suffering from clinically-relevant hearing loss. One such disease is cholesteatoma, which is an aggressive, invasive benign tumor, typically originating in the middle ear cavity, that slowly and irreversibly erodes critical structures responsible for the transmission of sound. Due to the recurrent nature of cholesteatoma, staged second-look surveillance surgeries are required to definitively rule out its recurrence following one or more surgical procedures to address the initial diagnosis, resulting in 84,000 cholesteatoma surgeries in the U.S. every year.

Diagnosis of middle ear disease, and cholesteatoma in particular, is challenging because the disease originates behind the eardrum. Externally visible symptoms are non-specific, and non-invasive external imaging (e.g., CT, MRI, etc.) cannot differentiate cholesteatoma from surrounding tissue of the middle ear cavity. Therefore, to accurately and comprehensively diagnose middle ear disease, and rule out recurrence beyond clinical suspicion, direct visual inspection is required.

The present standard of care for Cholesteatoma involves surgically displacing the eardrum and the ossicular chain (the small bones inside the middle ear cavity that mechanically couple the eardrum to the inner ear to transmit sound), thereby creating a hole from the ear canal into the middle ear cavity, through which the tissue within the middle ear cavity can be visualized. After the surveillance and/or any surgical procedures performed within the middle ear cavity, the surgeon reconstructs the ossicular chain, and the repairs the eardrum. While such surgical procedures are needed in all surgical procedures to provide a means of removing the cholesteatoma (which is done by scraping internal surfaces of the middle ear), it would be useful to have a definitive diagnosis before surgery (e.g., without the invasive procedures described above), which is not possible today. For instance, conventional endoscopic systems feature Even more importantly, patients typically receive second-look surveillances a year after the initial surgery, simply to look for recurrence, because if any minor piece of the cholesteatoma is left behind on the first surgery, the cholesteatoma will regrow.

Moreover, conventional endoscopic systems in general (beyond the particular context of otologic procedures) feature numerous issues associated with maneuverability of the endoscope device, dimensional limitations preventing use of sophisticated imaging and illumination components, and more. Such issues either limit the effectiveness of such endoscopic operations, or necessitate invasive surgical procedures.

What is needed, then, are improvements in apparatuses and methods for endoscopic procedures, particularly in the otologic context of middle ear access.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect of the present disclosure relates to an endoscopic apparatus. The apparatus may include a steerable tool having a first flexible tube concentrically nested within a second flexible tube. The apparatus may further include an image sensor disposed on the steerable tool, and one or more light sources disposed on the steerable tool. For instance, the image sensor may be a digital complementary metal oxide semiconductor (CMOS) image sensor. In some embodiments, an end cap is disposed on the steerable tool and, in turn, the image sensor and the one or more light sources are disposed on the end cap. The first flexible tube may include a first deflectable portion, and the second flexible tube may include a second deflectable portion. The first and second deflectable portions may be selectively weakened portions of the first and second flexible tubes that are angularly oriented, relative to a longitudinal axis of the steerable tool, in directions that are offset from each other by an angle equal to or less than one-hundred and eighty degrees. For instance, the first and second deflectable portions may face in opposite directions with respect to the longitudinal axis of the steerable tool. Accordingly, the steerable tool may be actuable (e.g., configured to be actuated, able to actuated, etc.) to form a bend by axially translating the first flexible tube relative to the second flexible tube. Alternatively, in some embodiments, the steerable tool is actuable to form a bend by axially translating the second flexible tube relative to the first flexible tube. In further embodiments, the steerable tool is actuable to form a bend by any relative axial translation between the first and second flexible tubes, including translation of the first flexible tube, translation of the second flexible tube, or translation of both flexible tubes.

Another aspect of the present disclosure relates to an alternative endoscopic apparatus, which may include the aforementioned steerable tool. The apparatus may further include a third flexible tube, and the steerable tool may be disposed within and axially movable relative to the third flexible tube. The apparatus may further include a rigid tube, and the third flexible tube may be disposed within and axially movable relative to the rigid tube.

Another aspect of the present disclosure relates to a method of accessing a region within a middle ear cavity of a patient. The method may include providing the aforementioned steerable tool, as well as providing at least a portion of a rigid tube within a nasal passageway that interfaces with the middle ear cavity via a Eustachian tube intermediate the nasal passageway and the middle ear cavity. The method may further include extending the aforementioned third flexible tube through an inner lumen of the rigid tube, such that at least a portion of the third flexible tube projects out of an opening formed by a distal end of the rigid tube, and a distal end of the third flexible tube is displaced along the Eustachian tube toward the middle ear cavity. The method may further include extending the steerable tool through an inner lumen of the third flexible tube, such that at least a portion of the steerable tool projects out of an opening formed by the distal end of the third flexible tube, and a distal end of the steerable tool is positioned within the middle ear cavity. The method may further include actuating the steerable tool to form a bend, such that the distal end of the steerable tool is steered toward the region within the middle ear cavity.

Numerous other objects, advantages and features of the present disclosure will be readily apparent to those of skill in the art upon a review of the following drawings and description of a preferred embodiment.

DETAILED DESCRIPTION

Figure 1:
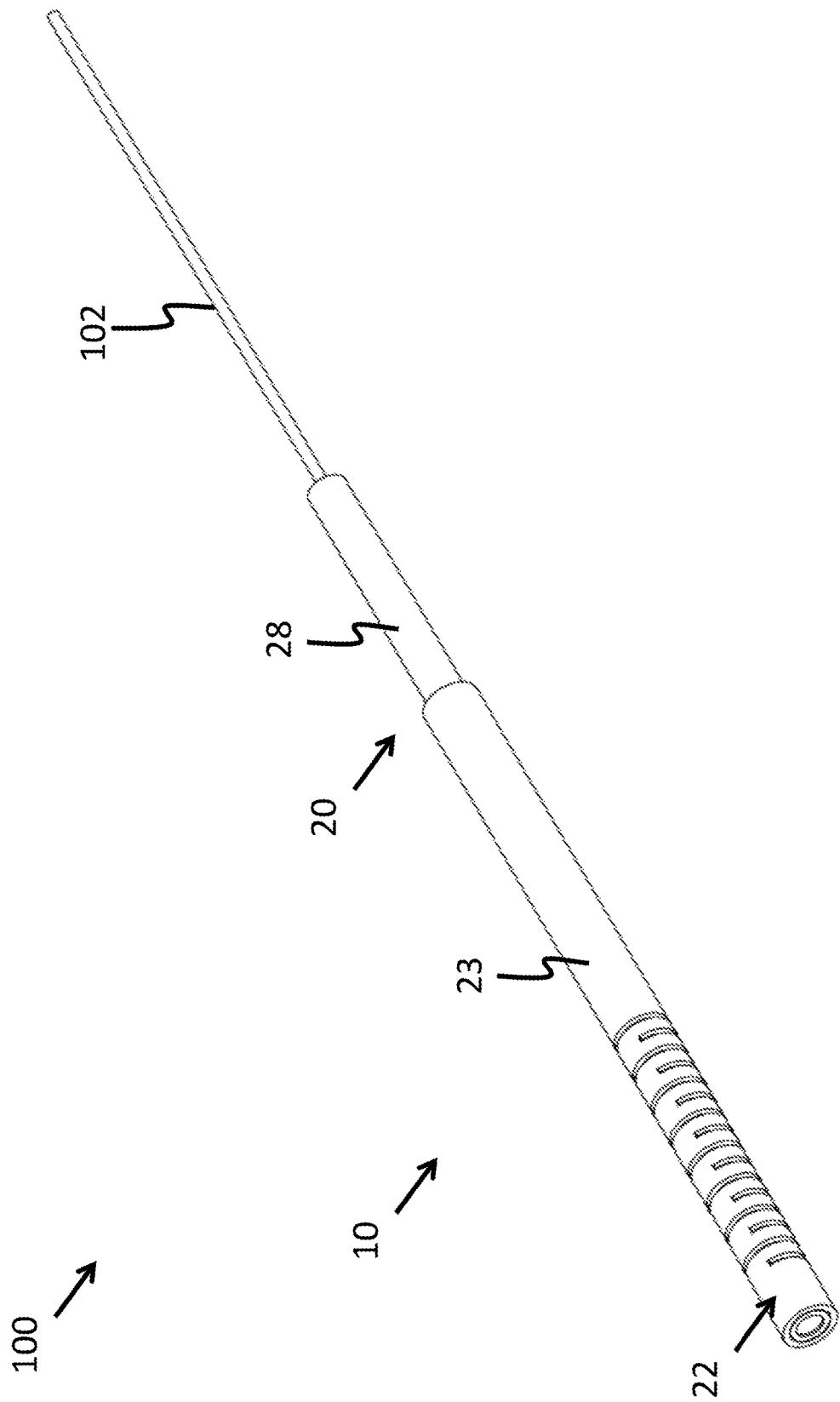
FIG. 1 is a perspective view of a tube assembly for an endoscopic apparatus, according to some embodiments of the present disclosure.

While the making and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention. Those of ordinary skill in the art will recognize numerous equivalents to the specific apparatus and methods described herein. Such equivalents are considered to be within the scope of this invention and are covered by the claims.

In the drawings, not all reference numbers are included in each drawing, for the sake of clarity. In addition, positional terms such as "upper," "lower," "side," "top," "bottom," etc. refer to the apparatus when in the orientation shown in the drawing. A person of skill in the art will recognize that the apparatus can assume different orientations when in use.

The present invention provides a method and apparatus for accessing a middle ear cavity of a patient using a diagnostic apparatus. While generally described in the context of accessing the middle ear cavity of the patient, it should be appreciated that the apparatuses and methods described herein may be applied in a wide variety of anatomical settings and situations.

Provided herein is an endoscopic apparatus (apparatus) 100, which may be advantageously applied in otologic settings for middle ear access. Accordingly, the apparatus 100 may be provided as an apparatus for operation by a user (e.g., a doctor, a surgeon, a healthcare provider, some other operator, etc.) in performing middle ear access, as well as in performing a wide variety of endoscopic procedures.

Referring now to FIG. 1, the apparatus 100 is shown, according to some embodiments of the present disclosure. The apparatus 100 may include a tube assembly 10, along with a steerable tool 20 incorporated therein. As described herein, the steerable tool 20 may be configured as an agonist-antagonist concentric tube manipulator, and thus be actuable (e.g., configured to be actuated, able to be actuated, etc.) to form a bend such that a distal end 22 of the steerable tool 20 is steered toward an anatomical region (e.g., a surgical site). For example, the steerable tool 20 may include a nested concentric tube structure including a first flexible tube 28 nested in (e.g., concentrically disposed within) a second flexible tube 23. Each flexible tube includes a rigid portion along its longitudinal length and a flexible portion along its longitudinal length in some embodiments. In further embodiments, the entire length of each flexible tube is rigid except for a flexible region at or near the distal end of the tube. As such, each flexible tube is flexible in that it includes a flexible portion. As described in greater detail below, a portion of each of the first and second flexible tubes 28, 23 may be configured to feature asymmetric flexibility in order in order to employ a concentric agonist-antagonist actuation scheme. In some embodiments, the tube assembly 10 further includes an image sensor assembly 102. At least a portion of the image sensor assembly 102 may be disposed within the steerable tool 20.

As described in greater detail below, one or more optical devices of the image sensor assembly 102 (e.g., an image sensor, one or more light sources, etc.) may be disposed on or near the distal end 22 of the steerable tool. Accordingly, once the tube assembly 10 has been inserted within a patient, the steerable tool 20 may be configured to facilitate precise navigation of such optical devices towards an anatomical region within the patient. Accordingly, as described herein, the apparatus 100 may be configured for access to, and surveillance within, various anatomical regions, cavities and structures, depending on the implementation.

Figure 2:
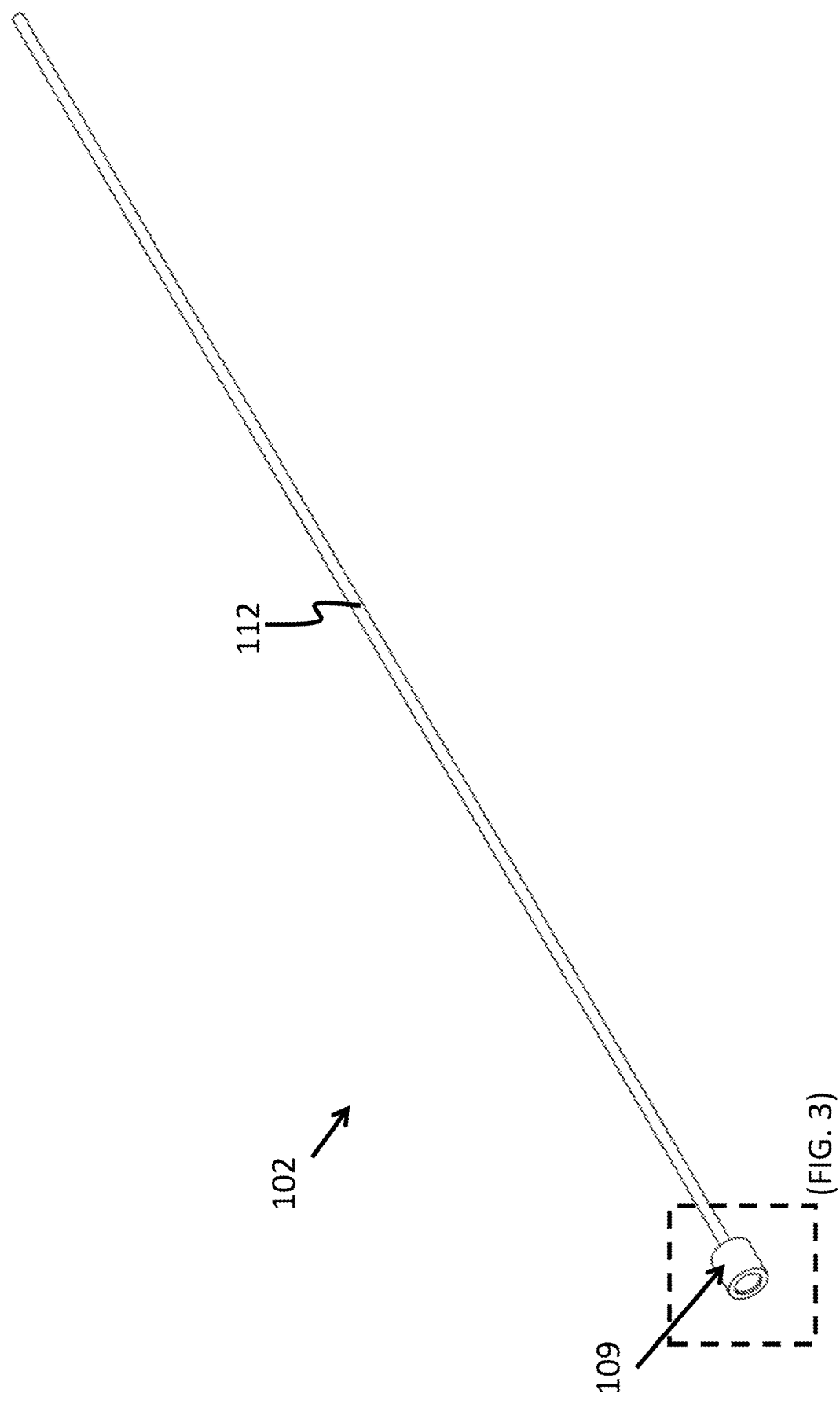
FIG. 2 is a perspective view of an image sensor assembly, according to some embodiments of the present disclosure.

Referring now to FIG. 2, the image sensor assembly 102 is shown in greater detail, according to some embodiments of the present disclosure. In some embodiments, the image sensor assembly 102 further includes wiring 112. As discussed in greater detail below, the wiring 112 may be configured to transmit power and/or data in support of one or more optical devices of the image sensor assembly 102, which may be disposed at or near a distal end 109 of the image sensor assembly 102.

Figure 3:
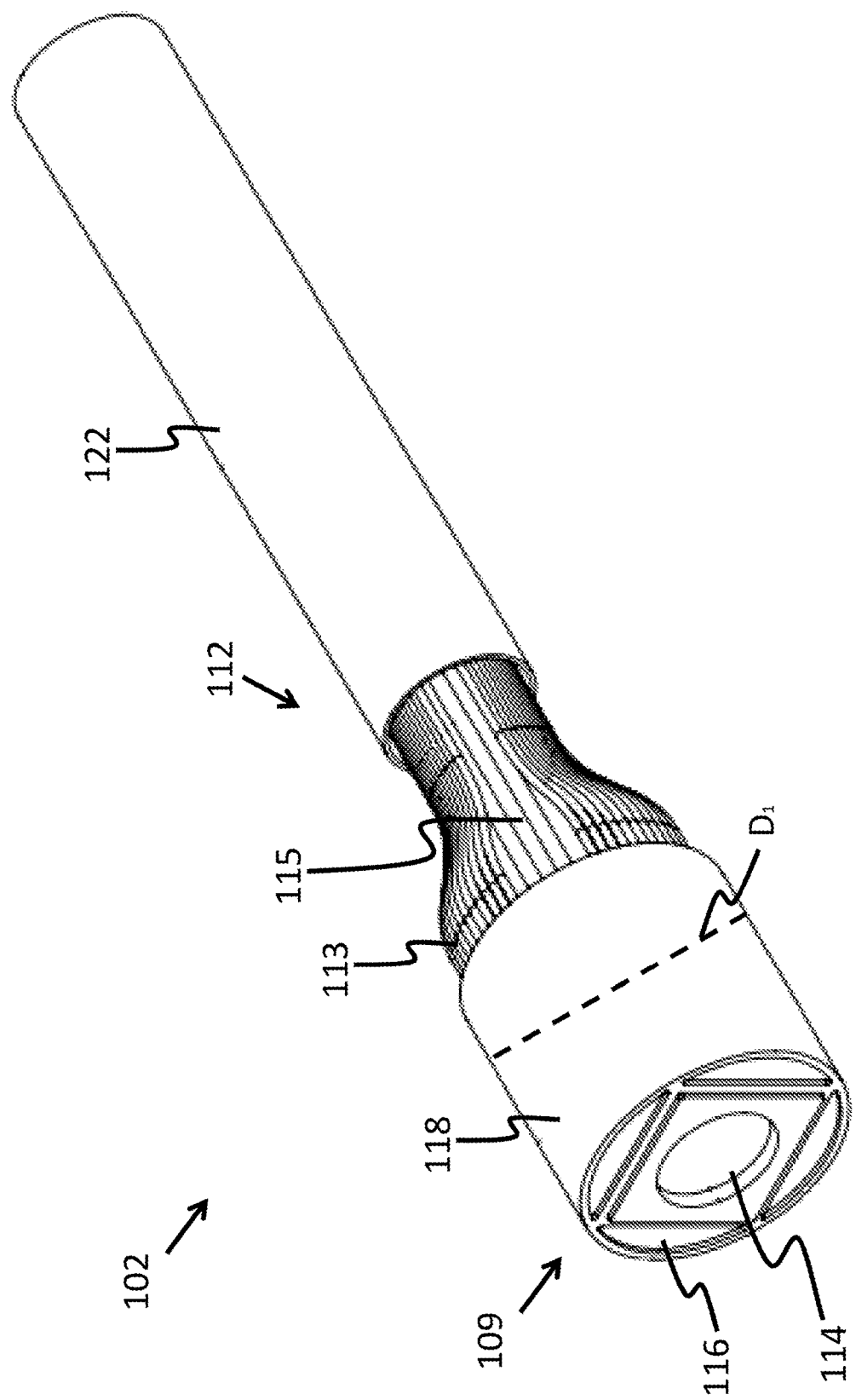
FIG. 3 is a detailed perspective view of an image sensor assembly, according to some embodiments of the present disclosure.

Referring now to FIG. 3, the distal end 109 of the image sensor assembly 102 is shown in greater detail, according to some embodiments of the present disclosure. As mentioned above with reference to FIG. 2, the wiring 112 of the image sensor assembly 102 may support one or more optical devices. Such optical devices may include an image sensor 114 and/or one or more light sources 116. The image sensor 114 and/or the one or more light sources 116 may be disposed at or near the distal end 109 of the image sensor assembly 102 and be in electrical communication with the wiring 112. In other words, the image sensor 114 may be disposed on the steerable tool 20, and the one or more light sources 116 may be disposed on the steerable tool 20.

In some embodiments, the one or more light sources 116 and the image sensor 114 are housed, at least partially, within an endcap 118. For instance, the endcap 118 may be configured to spatially locate and mechanically fix the image sensor 114, the one or more light sources 116, and the terminations of the wiring 112. The endcap 118 may be fabricated by any manufacturing process capable of generating millimeter-scale three-dimensional ("3D") components, such as Swiss machining, micro-injection molding, micro-3D printing, or electrical discharge machining).

In some embodiments, the image sensor 114 is a digital complementary metal oxide semiconductor ("CMOS") image sensor. The image sensor 114, particularly when provided as a CMOS image sensor, may enable digital visualization of an anatomical region. For example, the image sensor 114 may have a native resolution of two-hundred by two-hundred pixels or greater. In some embodiments, the resolution of the image sensor 114 is increased using interpolation techniques using software-based up-sampling.

In some embodiments, the wiring 112 includes an optical fiber bundle 113 and an image sensor wiring bundle 115. Accordingly, the wiring 112 may include signal and power wiring for each of the image sensor 114 and the one or more light sources 116.

In some embodiments, the one or more light sources 116 are configured to illuminate a anatomical region and may be housed within the endcap 118. Accordingly, the optical fiber bundle 113 may be a fiber-optic illumination bundle. For example, the optical fiber bundle 113, particularly when provided as a fiber-optic illumination bundle, may be configured to deliver light from an off-board light source to the one or more light sources 116, such that the one or more light sources 116 illuminate the anatomical region. In other embodiments, the one or more light sources 116 are provided as LEDs disposed within the endcap 118 itself, with the optical fiber bundle 113 extending proximally (e.g., away from the distal end 22) to on-board or off-board circuitry.

In some embodiments, the image sensor assembly 102 further includes a wiring jacket 122. The wiring jacket 122 may be configured to organize and relieve strain on the wiring 112. For example, the image sensor wiring and optical fiber bundles 115, 113 exit a proximal end of the endcap 118 (e.g., traveling away from the distal end 22) and are collected and encapsulated within the wiring jacket 122. The wiring jacket 122 may be constructed of any suitable material including, but not limited to, a polymeric material (e.g., polyimide, PTFE, fluorinated ethylene propylene, etc.).

Figure 4A:
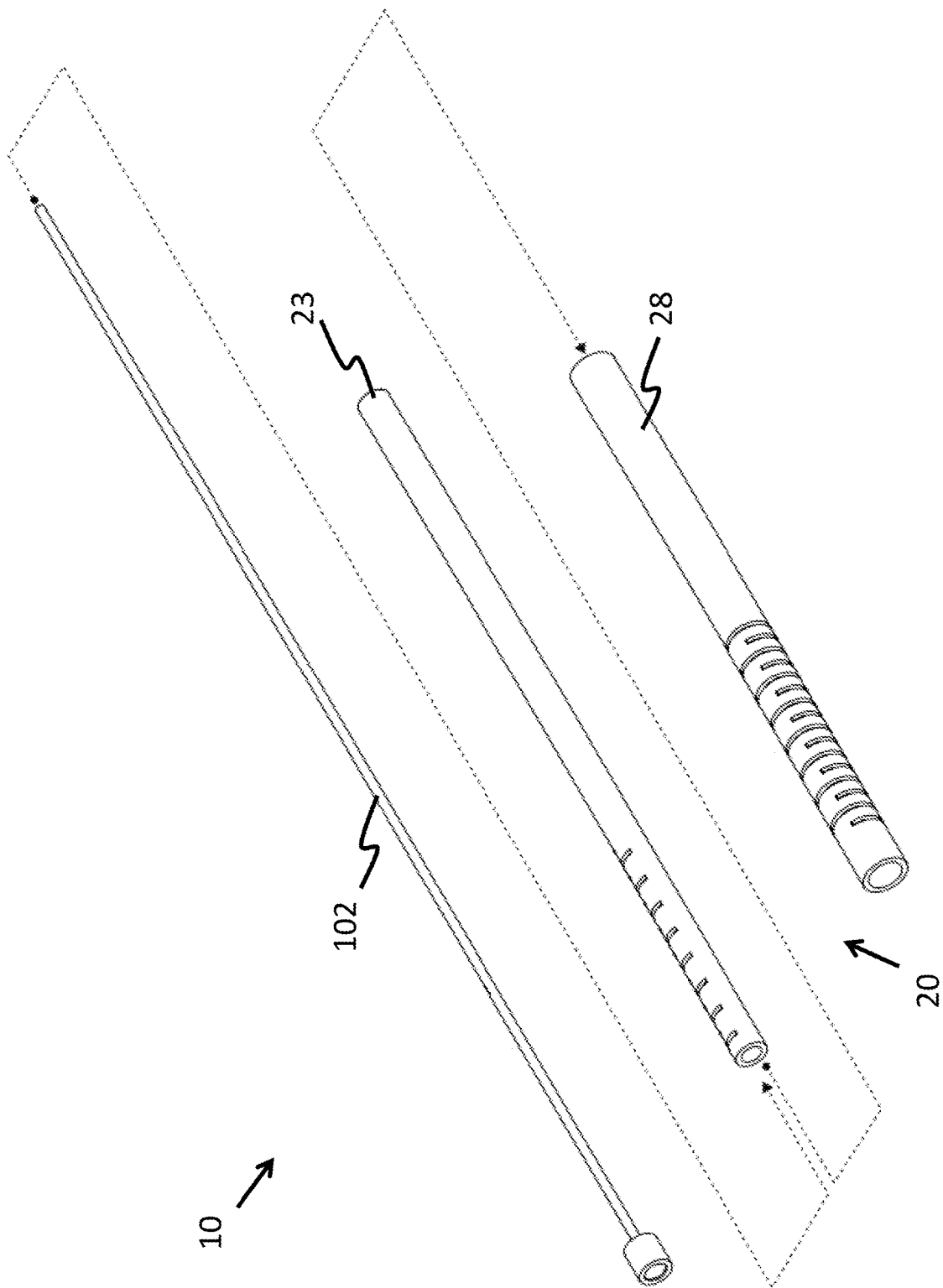
FIG. 4A is a perspective schematic view showing a first portion of a method of assembling a tube assembly for an endoscopic apparatus, according to some embodiments of the present disclosure.
Figure 4B:
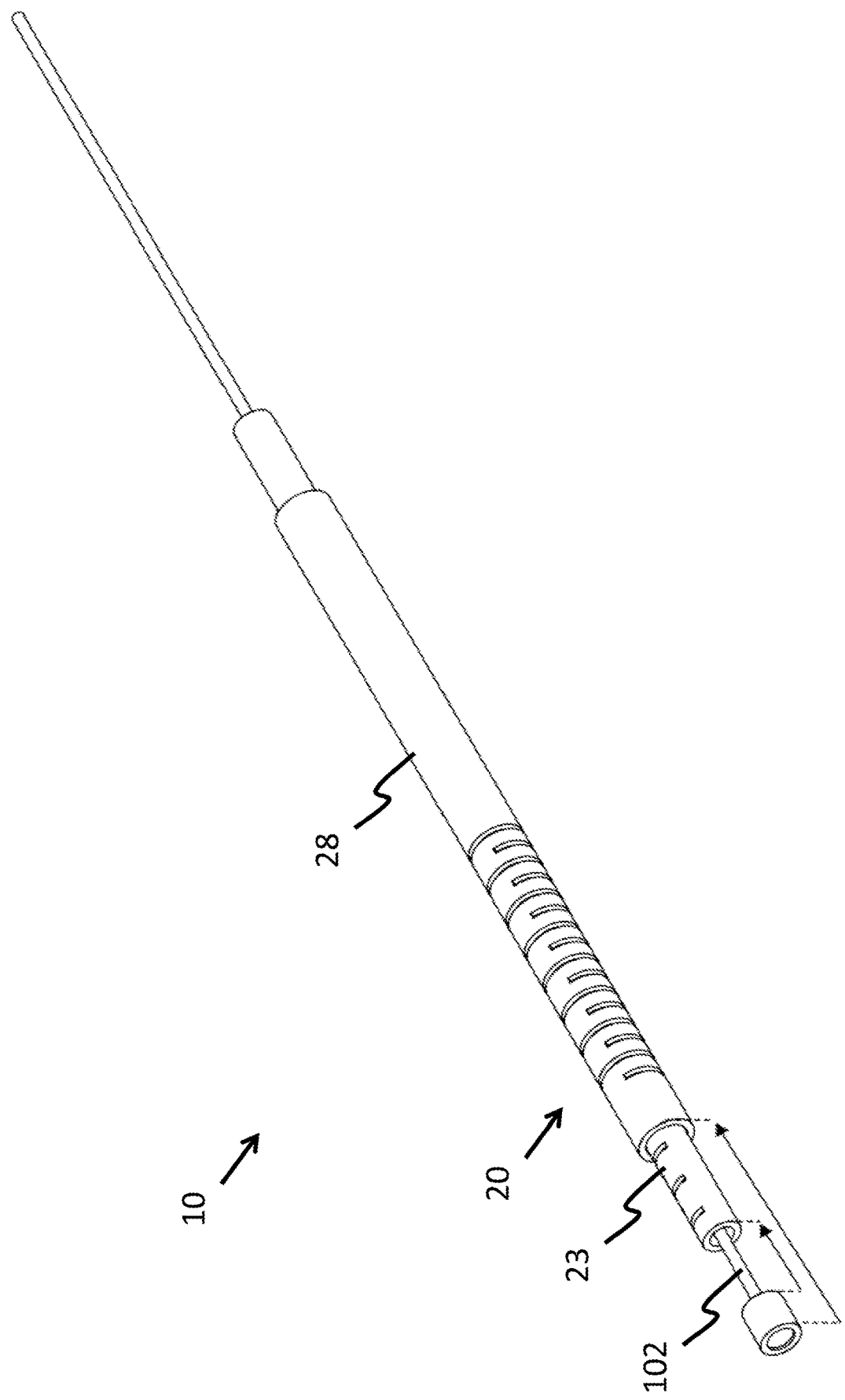
FIG. 4B is a perspective schematic view showing a second portion of a method of assembling a tube assembly for an endoscopic apparatus, according to some embodiments of the present disclosure.
Figure 6A:
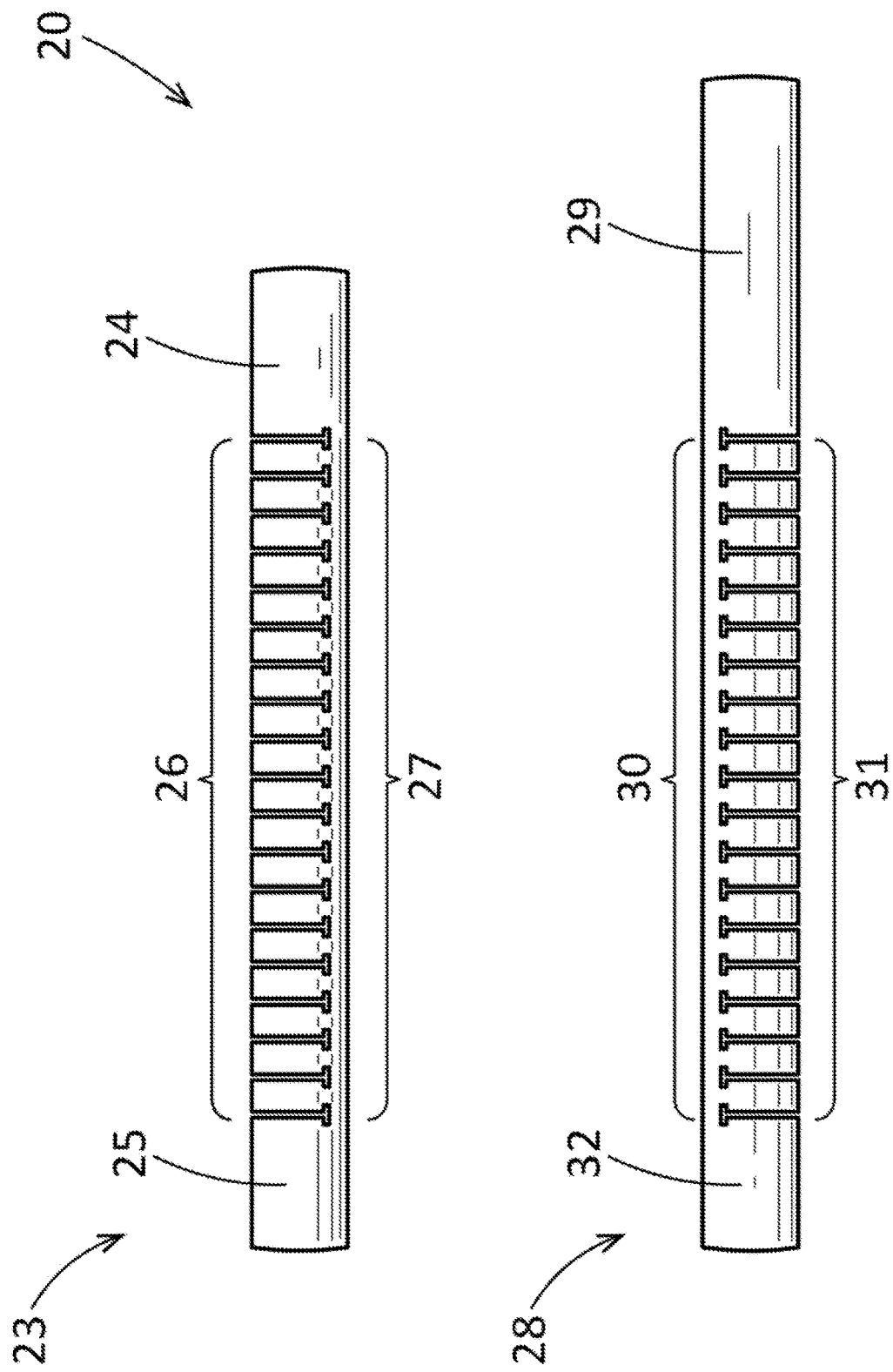
FIG. 6A is a perspective view of an embodiment of a first flexible tube and a second flexible tube of a steerable tool, according to some embodiments of the present disclosure.

Referring now to FIGS. 4A and 4B, an exemplary method of providing the tube assembly 10 is shown, according to some embodiments of the present disclosure. Referring particularly to FIG. 4A, the image sensor assembly 102 (the wiring 112, in particular) may be fed through an inner lumen of the first flexible tube 28 (e.g., through a distal end 32 of the first flexible tube 28, depicted with reference to FIG. 6A), such that the image sensor assembly 102 is disposed within the first flexible tube 28. The first flexible tube 28 (and the image sensor assembly 102), in turn, may be fed through the second flexible tube 23 (e.g., through a proximal end 24 of the second flexible tube 23, depicted with reference to FIG. 6A), such that the image first flexible tube 28 (and the image sensor assembly 102 therein) is disposed within the second flexible tube 23, thus providing the steerable tool 20 with the image sensor assembly 102 disposed therein.

Referring particularly to FIG. 4B, once assembled as discussed above with reference to FIG. 4A, the image sensor assembly 102, first flexible tube 28, and second flexible tube 23 may be axially adjusted relative to one another in order to provide the tube assembly 10 as shown with reference to FIG. 1. In some embodiments, the image sensor assembly 102 is fastened within the steerable tool 20. As a first example, the endcap 118 may be fixed to the first flexible tube 28 and/or the second flexible tube 23 through application of biocompatible epoxy. As a second example, the endcap 118 may be fixed to the first flexible tube 28 and/or the second flexible tube 23 through laser welding. Additionally, the distal ends of the first and second flexible tubes 28, 23 may be fastened to each other at or near their distal ends. For instance, as depicted with reference to FIGS. 5A-5C, the first and second flexible tubes 28, 23 may be fastened to one another via a weld joint 103 near their distal ends.

Figure 5A:
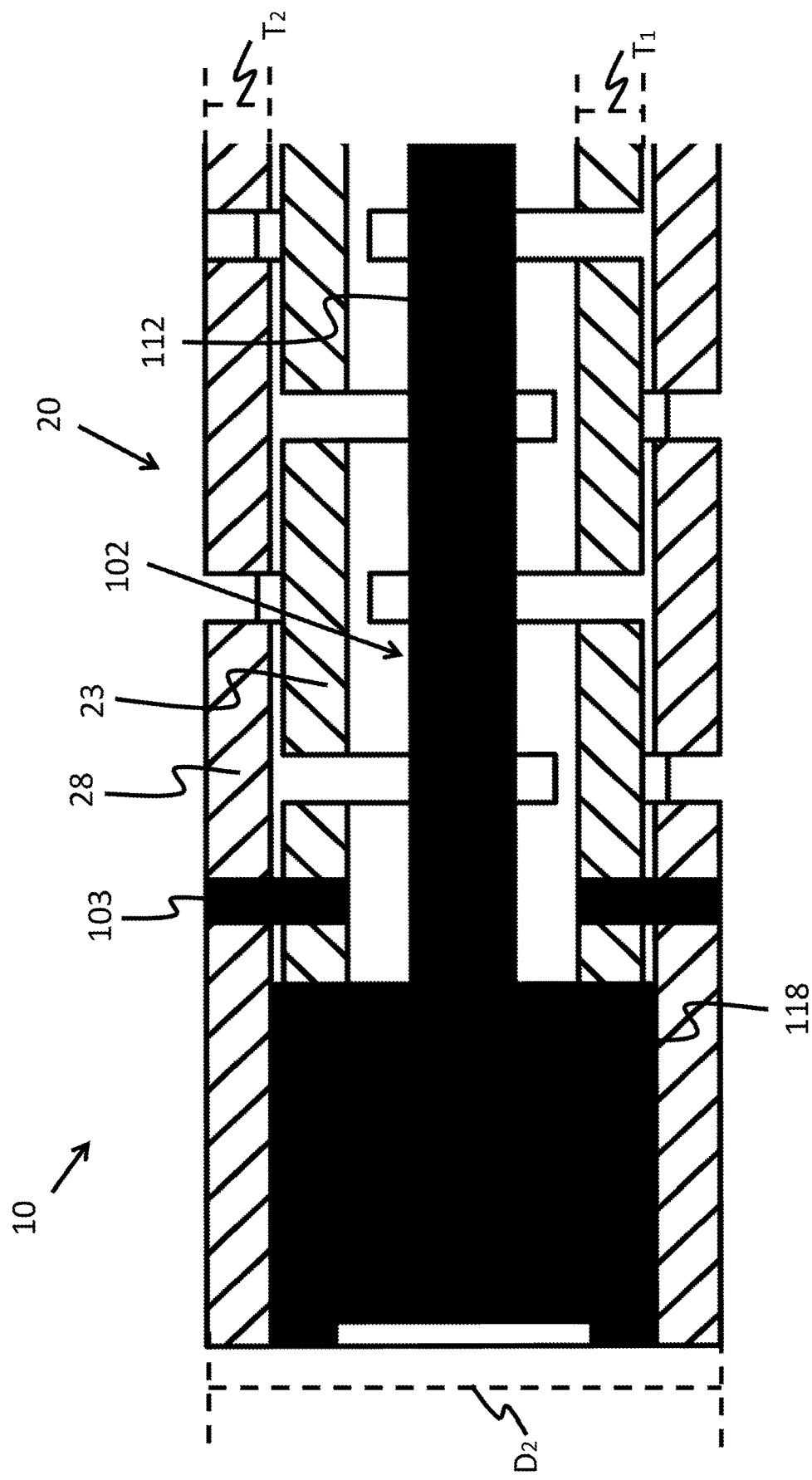
FIG. 5A is a side cross-sectional view of a tube assembly for an endoscopic apparatus, according to some embodiments of the present disclosure.
Figure 5B:
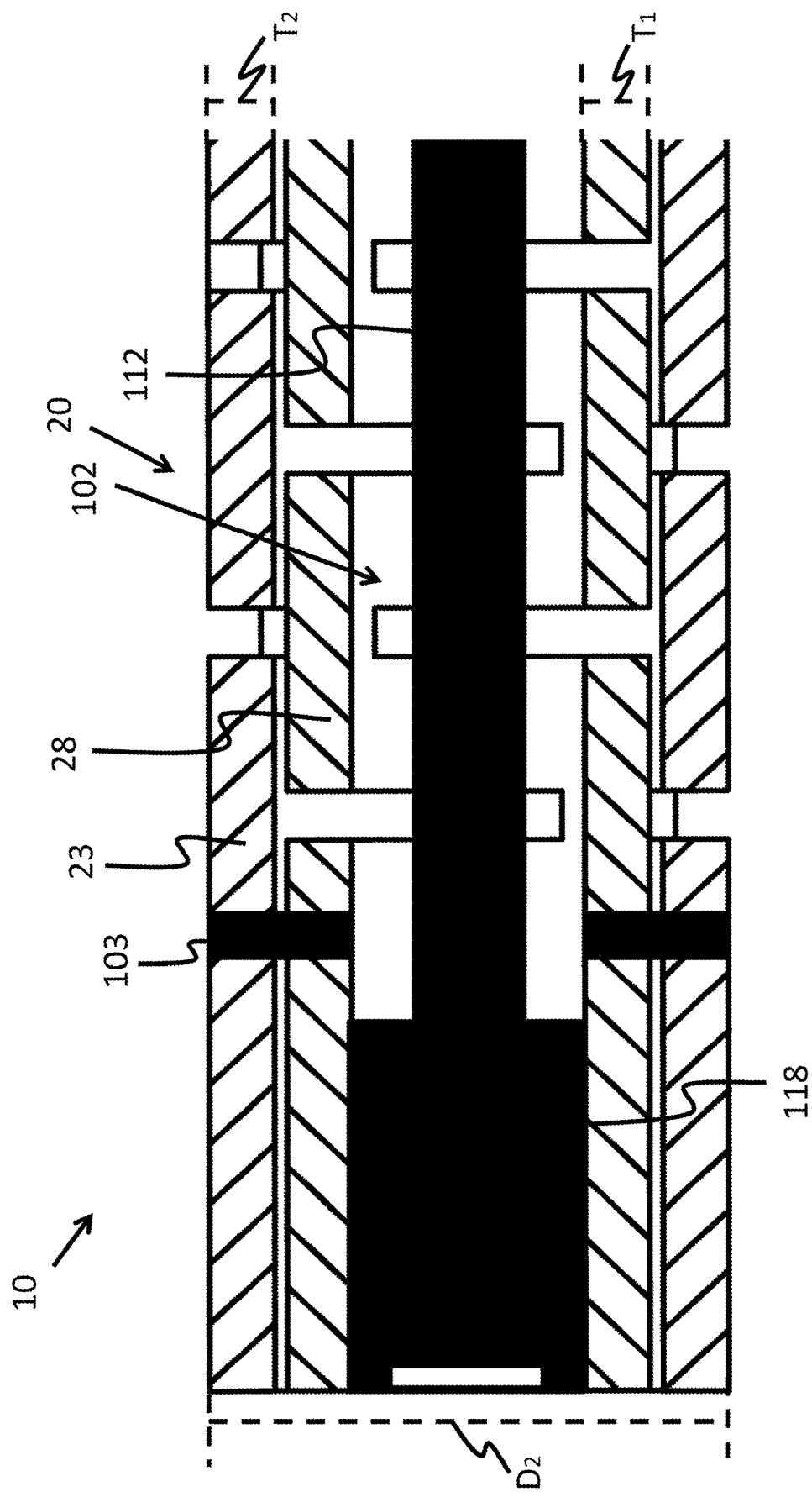
FIG. 5B is a side cross-sectional view of a tube assembly for an endoscopic apparatus, according to some embodiments of the present disclosure.
Figure 5C:
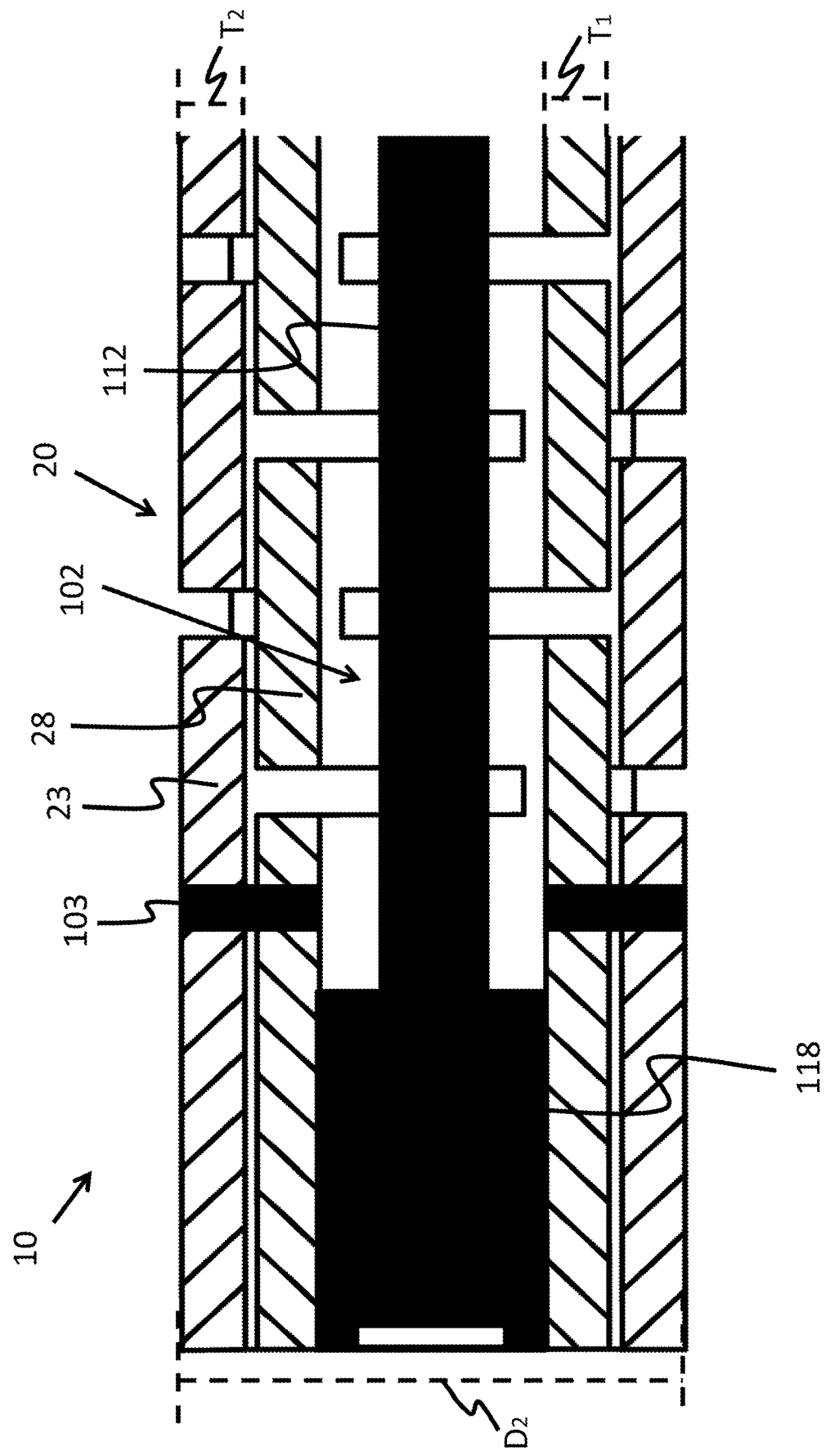
FIG. 5C is a side cross-sectional view of a tube assembly for an endoscopic apparatus, according to some embodiments of the present disclosure.

Referring now to FIGS. 5A-5C, various integrations of the image sensor assembly 102 on the steerable tool 20 are shown, according to various embodiments of the present disclosure. The tube assembly 10 (particularly a distal end of the steerable tool 20) may include an overall diameter D2. The first flexible tube 28 may include a wall thickness T1. The second flexible tube 23 may include a wall thickness T2. As shown with reference to FIG. 3, the endcap 118 may include a diameter D1.

Referring particularly to FIG. 5A, the endcap 118 may be disposed within the second flexible tube 23, and a proximal side of the endcap 118 (e.g., where the wiring 112 extend from as shown with reference to FIG. 3) abuts a distal end of the first flexible tube 28. This configuration may provide an advantageous tradeoff of minimizing D2 (which, in such cases, is a combination of D1 and T2), while also offering an increased surface area for adhering the endcap 118 to the first and second flexible tubes 28, 23. In such cases, the endcap 118 may be glued or welded to an inner wall of the second flexible tube 23, and the first and second flexible tubes 28, 23 may be welded together at a location proximal to the endcap 118 (thus providing the weld joint 103 as shown). For instance, welding the first and second flexible tubes 28, 23 in order to provide the weld joint 103 in this case may be achieved by machining a window or hole in the second flexible tube 23 and edge welding around the periphery of such window or hole to the first flexible tube 28.

Referring particularly to FIG. 5B, the endcap 118 may abut a distal tip of each of the first and second flexible tubes 28, 23, and may be fastened to the second flexible tube 23. This configuration may provide an advantageous overall minimization of D2 (where, in such cases, D2 is equal to or substantially equivalent to D1). For instance, in such cases, D2 may only be limited by (or, in other words, may only need to be so large as) by the size of the endcap 118 itself (or, in other words, the size of the image sensor 114 and/or the one or more light sources 116 themselves).

Referring particularly to FIG. 5C, the endcap 118 may be positioned within the first flexible tube 28. In such cases, the endcap 118 may be glued or laser-welded to the inner wall of the first flexible tube 28. In turn, the first and second flexible tubes 28, 23 may be welded together at their distal ends (thus providing the weld joint 103 as shown). As a first example, the distal ends of the first and second flexible tubes 28, 23 may be welded together via the window or hole method as described above with reference to FIG. 18A. As a second example, the distal ends of the first and second flexible tubes 28, 23 may be welded together by slightly offsetting the second flexible tube 23 proximally with respect to the first flexible tube 28, and creating a fillet weld around a distal edge of the second flexible tube 23. As a third example, the distal ends of the first and second flexible tubes 28, 23 may be welded together by positioning the distal ends of the first and second flexible tubes 28, 23 flush relative to each other and edge welding the first and second flexible tubes 28, 23 together. This configuration may provide an advantageous ease of assembly. In such cases, D2 may be equivalent to a combination of D1, T1, and T2. In further embodiments, the distal ends of the first and second flexible tubes 28, 23 may be joined using any suitable fastener or any suitable mode of fixation to provide a connection therebetween.

Referring now to FIGS. 6A-6F, steerable tool 20 is illustrated in greater detail, according to various embodiments of the present disclosure. In some embodiments, and as discussed above with reference to FIGS. 5A-5C, the first and second flexible tubes 28, 23 are connected or fastened to each other (e.g., via welding or adhesive bonding) at or around the distal end 22 of the steerable tool 20 (e.g., at the distal ends of the first and second flexible tubes 28, 23). The first flexible tube 28 and the second flexible tube 23 may be constructed of any suitable material including, but not limited to, Nitinol, stainless steel, and plastics/polymers. In some embodiments, the first flexible tube 28 and the second flexible tube 23 are formed from laser-cut hypodermic tubes.

Figure 6B:
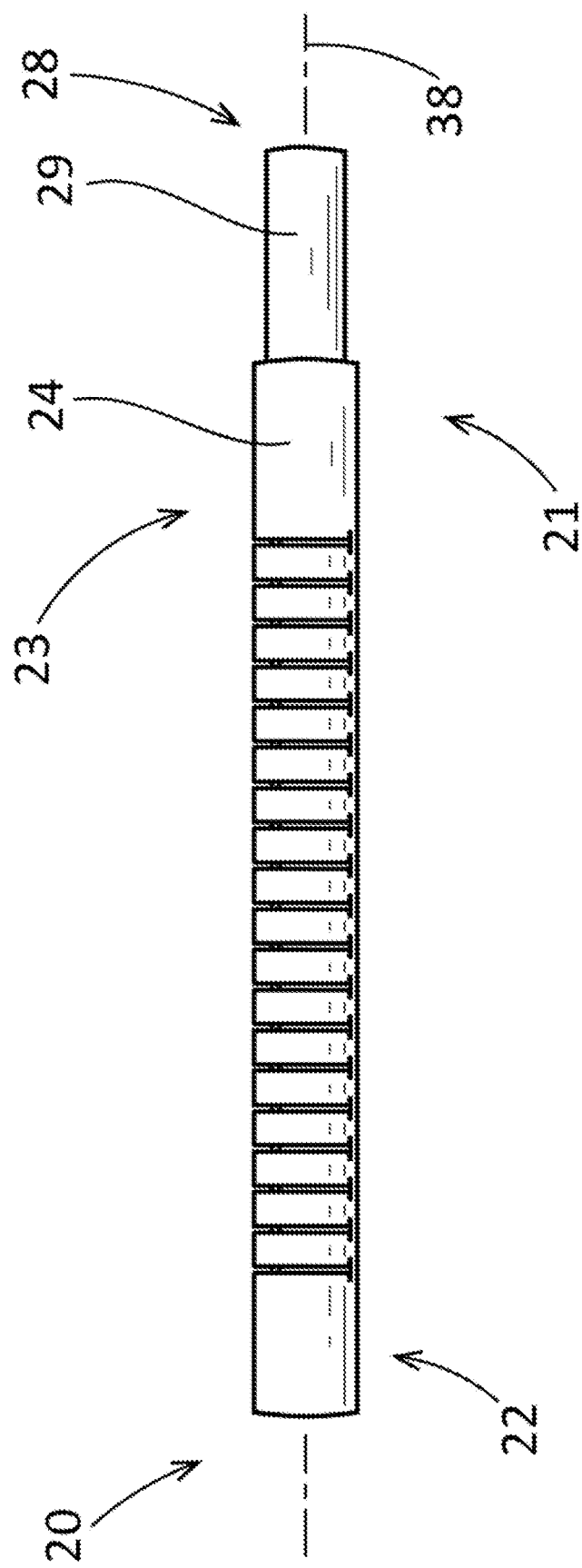
FIG. 6B is a perspective view of the first flexible tube and the second flexible tube of FIG. 6A assembled to form a steerable tool, according to some embodiments of the present disclosure.

The pre-configured state of the steerable tool 20 may be the straight tubular configuration depicted with particular reference to FIG. 6B. For instance, the steerable tool 20 as shown may be provided by positioning the first flexible tube 28 relative to the second flexible tube 23, such that the first flexible tube 28 is concentrically nested within, and at least partially axially aligned with, the second flexible tube 23. The steerable tool 20 may be configured to be actuable to bend in opposite directions, as shown with reference to FIGS. 6C-6F. In other words, the steerable tool 20 may be configured to form a bend on one plane. Alternatively, in other embodiments, steerable tool 20 may be configured to form a bend along a three-dimensional curvilinear arc.

Configuring the inner and outer steerable tool tubes 28, 23 to employ the aforementioned concentric agonist-antagonist actuation scheme may be achieved by creating a deflectable portion (e.g., a flexible portion, a selectively weakened portion, etc.) of each of the first and second flexible tubes 28, 23 to provide respective regions of relatively low-stiffness (e.g., flexible "spines" of material) thereon. Accordingly, the first flexible tube 28 may include a first deflectable portion 31 and a first tubular sidewall portion 30 extending between the distal end 32 and a proximal end 29. Similarly, the second flexible tube 23 may include a second deflectable portion 26 and a second tubular sidewall portion 27, creating a flexible portion of the second flexible tube 23 between a distal end 25 and the proximal end 24.

In order to provide the first and second deflectable portions 31, 26, each of the first and second flexible tubes 28, 23 may have material removed (e.g., via laser cutting), thereby creating a flexible "spine" of sidewall material on each of the inner and outer steerable tool tubes 28, 23. Owing to this configuration, the first and second flexible tubes 28, 23 are axially stiff along the first and second tubular sidewall portions 30, 27 (respectively) and axially compliant along the first and second deflectable portions 31, 26 (respectively). The first and second deflectable portions 31, 26 may be configured such that the first and second flexible tubes 28, 23 feature an asymmetric elasticity (e.g., a first elasticity that is less than a second elasticity) between them. This asymmetric elasticity makes the first and second flexible tubes 28, 23 bendable (as a result of actuation) along the first and second tubular sidewall portions 30, 27 (respectively).

In some embodiments, the first and second deflectable portions 31, 26 are provided by laser-machining a slit pattern in their respective sidewalls along a portion of the length of the steerable tool 20 that is proximal relative to the distal end 22 of the steerable tool 20. In other words, the first and second flexible tubes 28, 23 may have a first series of cutout sections and a second series of cutout sections (respectively) spaced lengthwise along the longitudinal axis 38 of the steerable tool 20 (the first and second deflectable portions 31, 26, in particular) thereby forming respective spines of flexible sidewall material on each of the first and second flexible tubes 28, 23. In the example configuration of FIGS. 6A-6D, the slit patterns on the first and second flexibles 28, 23 are formed with rectangular notches removed from the sidewalls of the tubes. The notches leave intact the first tubular sidewall portion 30 of the first flexible tube 28 and the second tubular sidewall portion 27 of the second flexible tube 23.

Figure 6C:
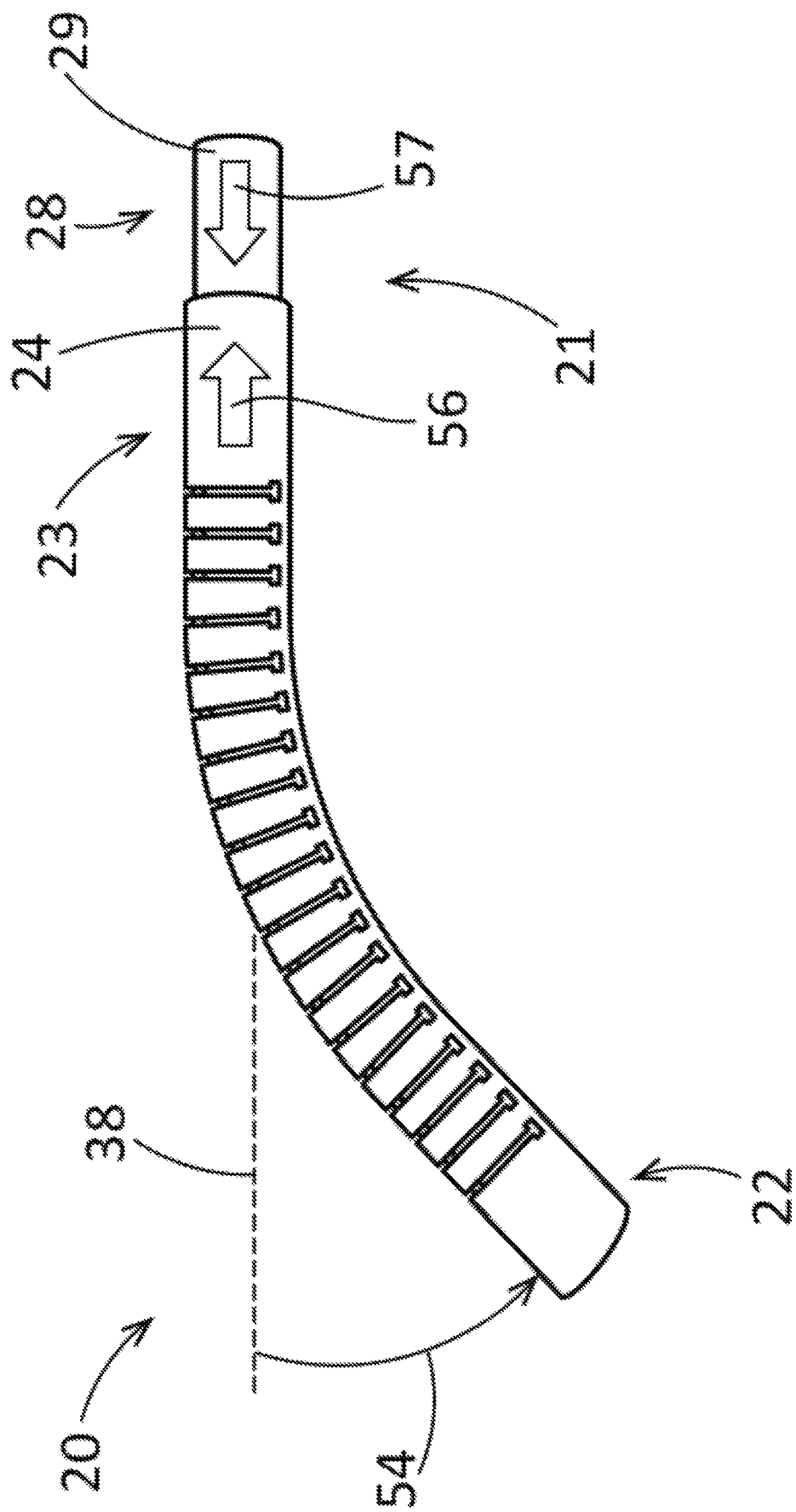
FIG. 6C is a perspective view of the assembled steerable tool of FIG. 6B being actuated to form a bend in a first direction, according to some embodiments of the present disclosure.
Figure 6D:
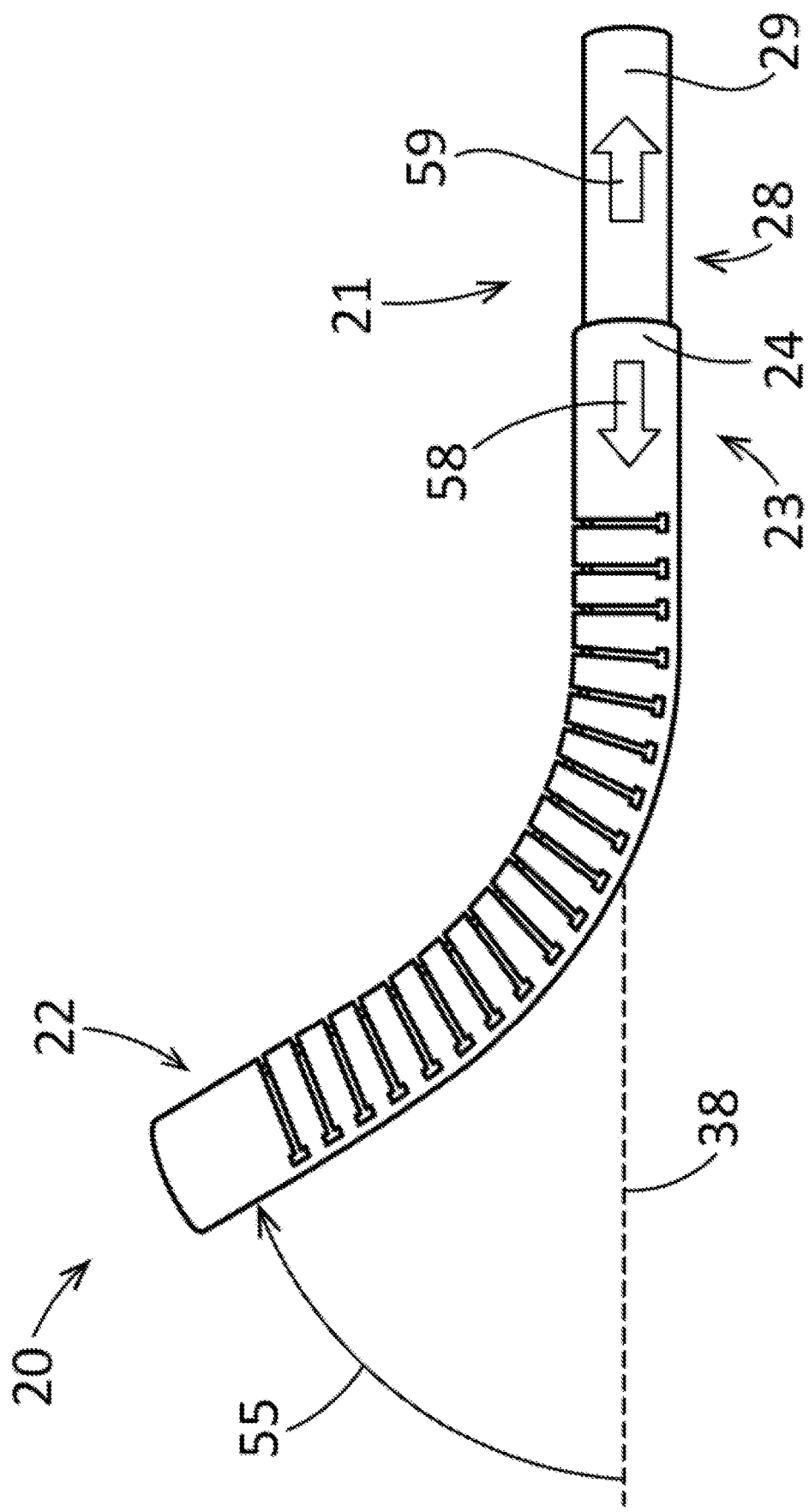
FIG. 6D is a perspective view of the assembled steerable tool of FIG. 6B being actuated to form a bend in a second direction different than the first direction of FIG. 6C, according to some embodiments of the present disclosure.
Figure 6E:
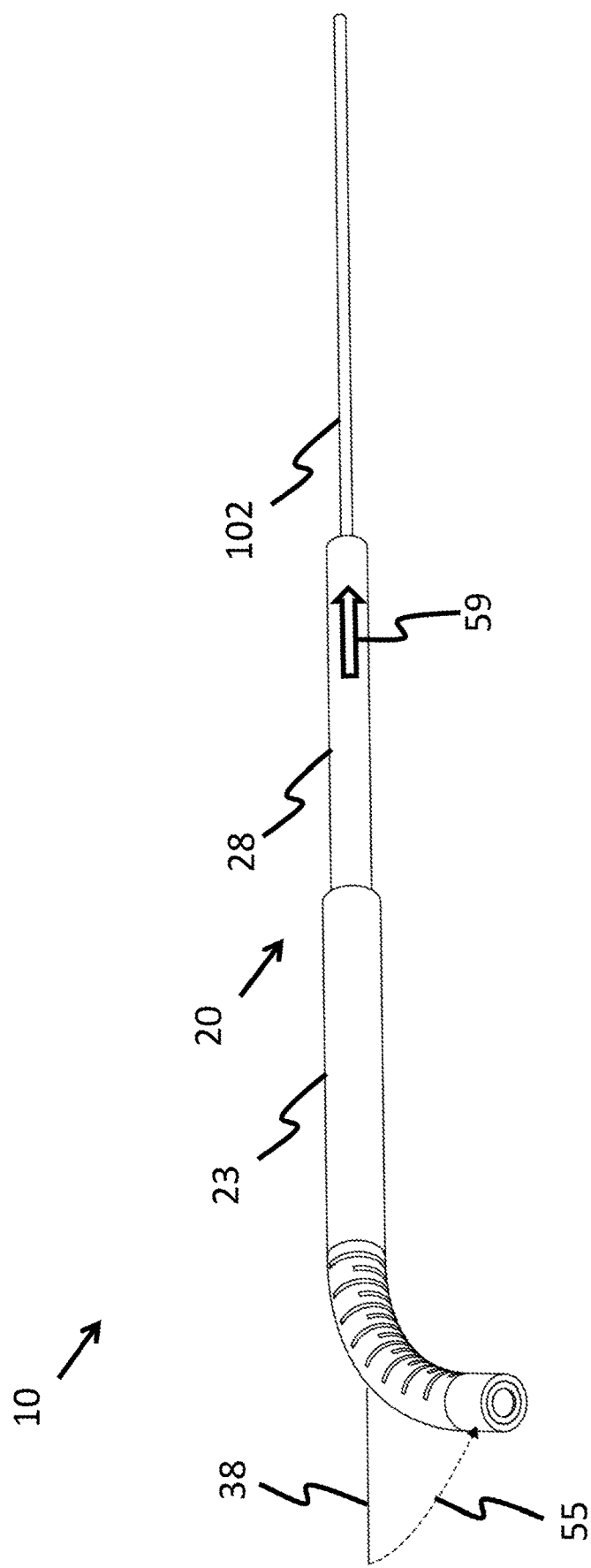
FIG. 6E is a perspective view of a tube assembly being actuated to form a bend in a first direction, according to some embodiments of the present disclosure.
Figure 6F:
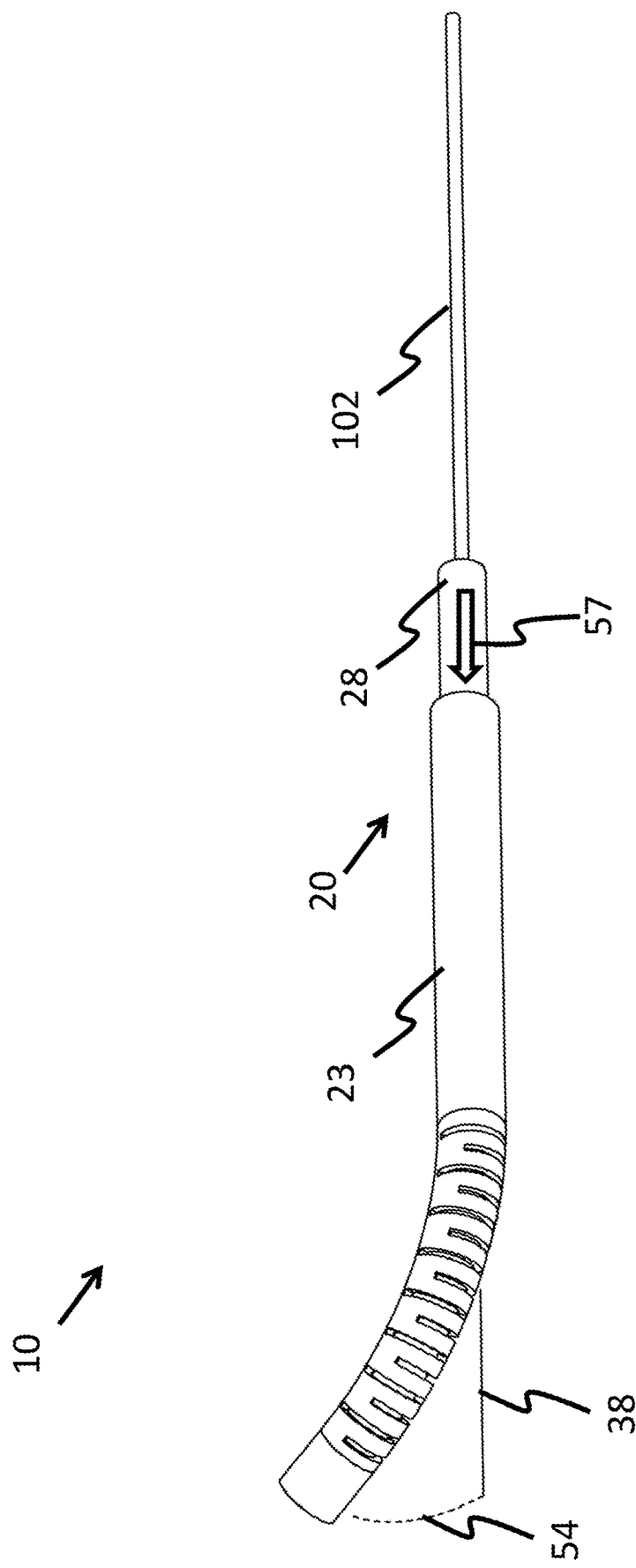
FIG. 6F is a perspective view of the tube assembly of FIG. 6E being actuated to form a bend in a second direction different than the first direction of FIG. 6E, according to some embodiments of the present disclosure.

In other embodiments, and as shown with particular reference to FIGS. 6E and 6F, the first and second deflectable portions 31, 26 are provided by laser-machining a serpentine profile into their respective sidewalls along a portion of the length of the steerable tool 20 that is proximal relative to the distal end 22 of the steerable tool 20.

In some embodiments, the first and second flexible tubes 28, 23 are fastened to one another (e.g., at their distal ends 32, 25) such that the first and second deflectable portions 31, 26 are angularly oriented, relative to a longitudinal axis 38 (shown with particular reference to FIGS. 6C and 6D) of the steerable tool 20, in directions that are offset from each other by an angle equal to or less than one-hundred and eighty degrees. For instance, the first and second deflectable portions 31, 26 may face in radially opposite directions with respect to the longitudinal axis 38. In further embodiments, the relative angular orientation between first and second deflectable portions 31, 26 about longitudinal axis 38 is between one-hundred and eighty degrees and zero degrees. In some embodiments, the relative angular orientation between first and second deflectable portions 31, 26 is one-hundred and eighty degrees. In further embodiments, the relative angular orientation between first and second deflectable portions 31, 26 about longitudinal axis 38 is adjustable to any desired relative angular orientation to achieve an optimal bending profile of distal end 22. Accordingly, the first and second deflectable portions 31, 26 may be opposed to each other. Because the first and second flexible tubes 28, 23 are connected at the distal end 25 of the second flexible tube 23 and the distal end 32 of the first flexible tube 28 (thus forming a connection at the distal end 22 of the assembled steerable tool 20), the steerable tool 20 can be actuated to cause or effectuate bending along its length through applying an axial force (e.g., an axial push and/or pull) on the first flexible tube 28 and/or the second flexible tube 23, or both flexible tubes sequentially or simultaneously. For instance, by translating the proximal ends 29, 24 of the first and/or second flexible tubes 28, 23 (respectively) with respect to each other, a bending motion is produced at the distal end 22 of the steerable tool 20 along a plane or arc of bending as defined by the first and second deflectable portions 31, 26, thereby steering the distal end 22 of the steerable tool 20 in a bi-directional fashion. Accordingly, the steerable tool 20 may be actuated to form a bend by axially translating the first flexible tube 28 relative to the second flexible tube 23 (or vice-versa). As discussed in greater detail below, the direction in which the steerable tool 20 bends may depend on the push/pull directions of the actuation force exerted on the first and/or second flexible tubes 28, 23.

Figure 8A:
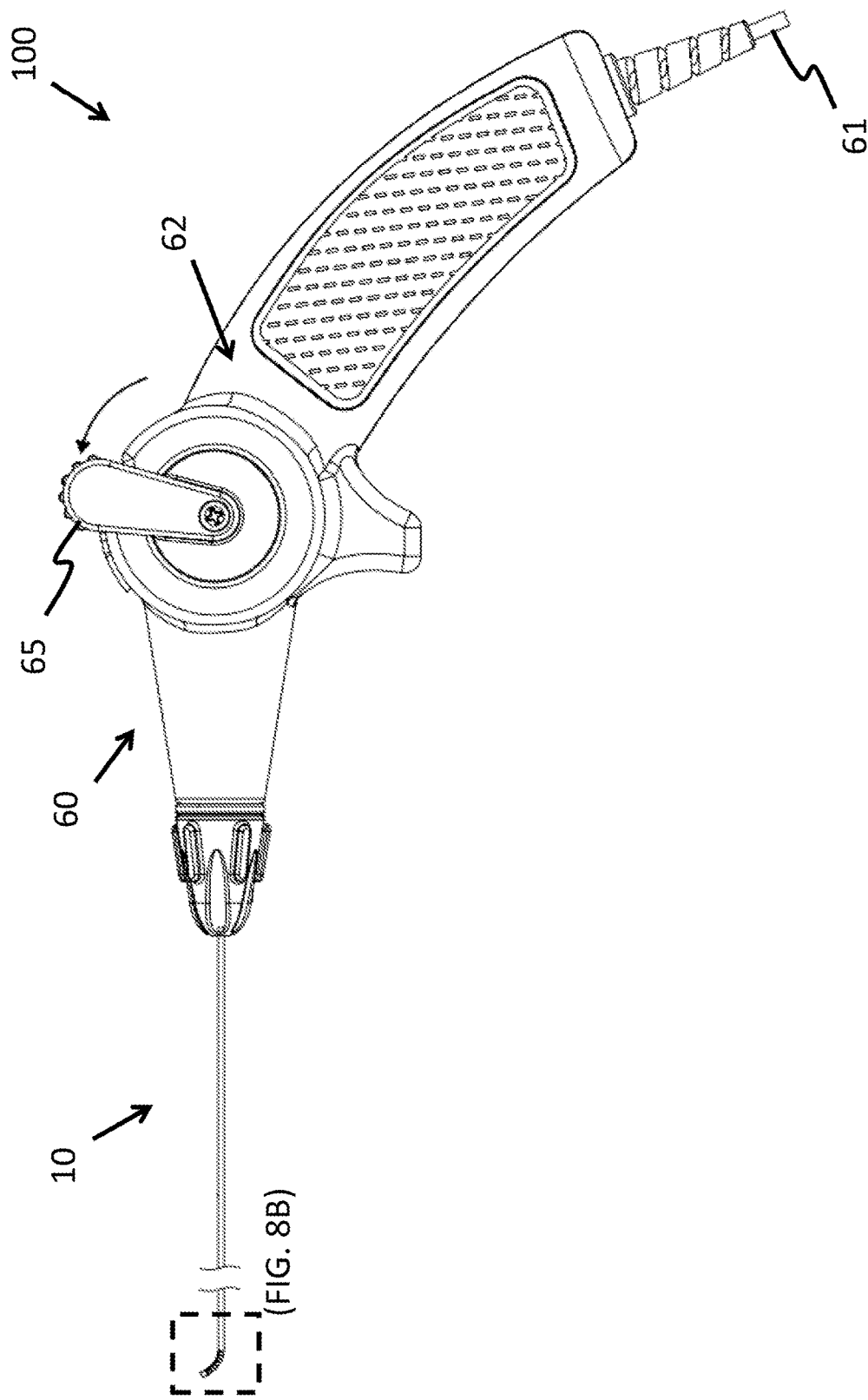
FIG. 8A is a perspective view of a user interface of an endoscopic apparatus actuating a steerable tool of the endoscopic apparatus to form a bend in a first direction, according to some embodiments of the present disclosure.
Figure 8B:
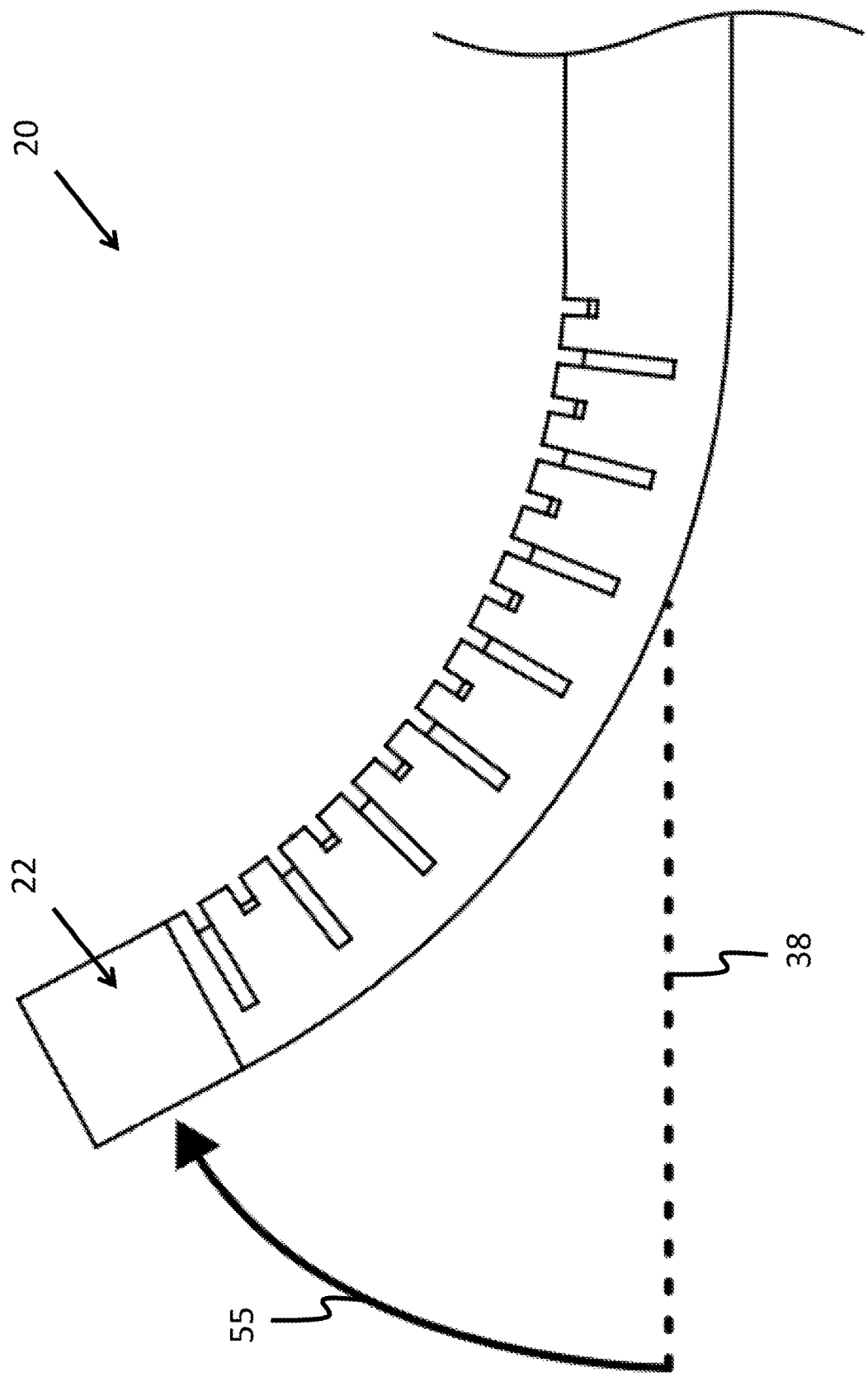
FIG. 8B is a detailed perspective view of the steerable tool of FIG. 8A, according to some embodiments of the present disclosure.
Figure 8C:
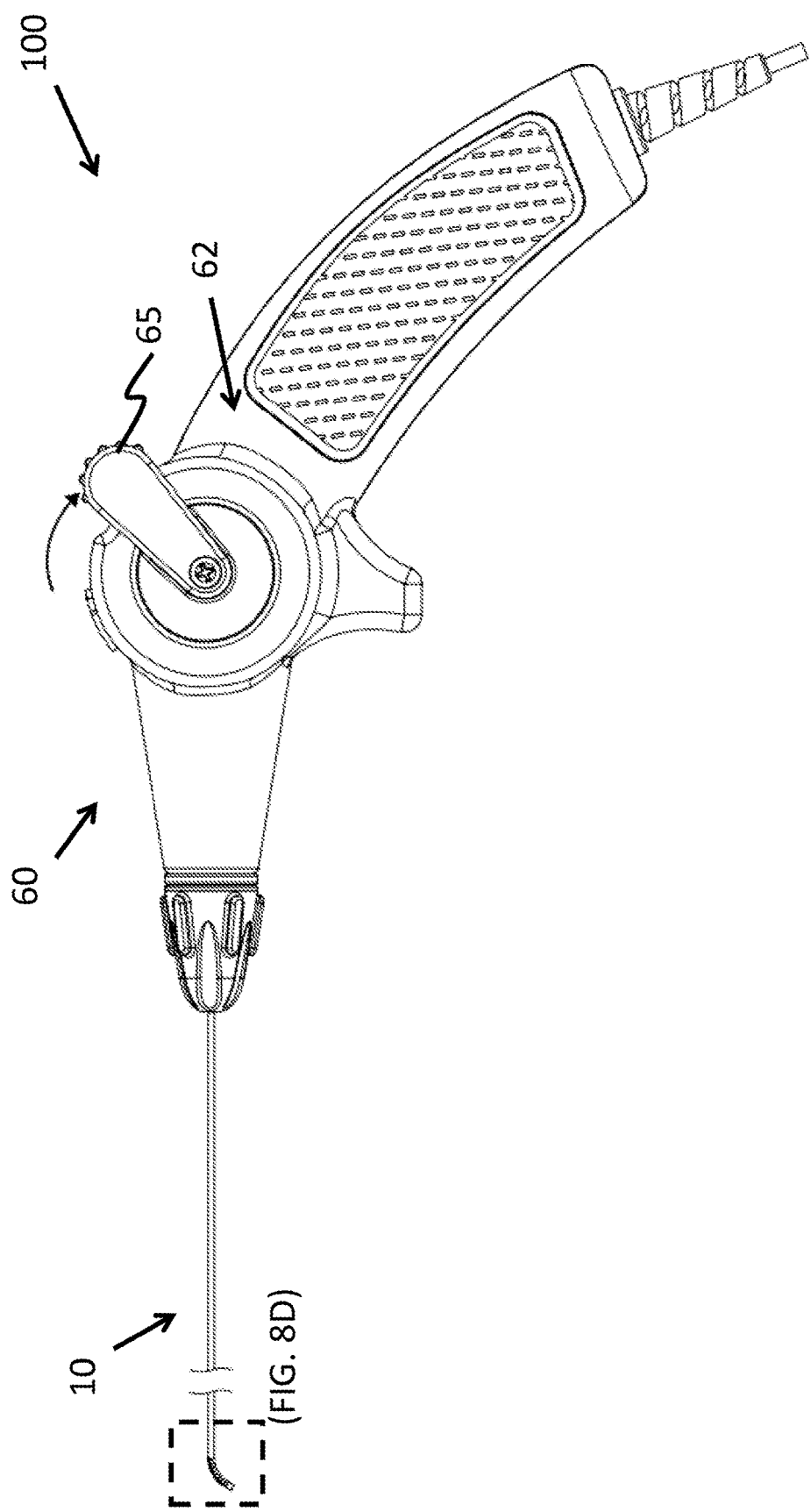
FIG. 8C is a perspective view of the user interface of the endoscopic apparatus of FIG. 8A actuating the steerable tool of FIG. 8A to form a bend in a second direction different than the first direction of FIG. 8A, according to some embodiments of the present disclosure.
Figure 8D:
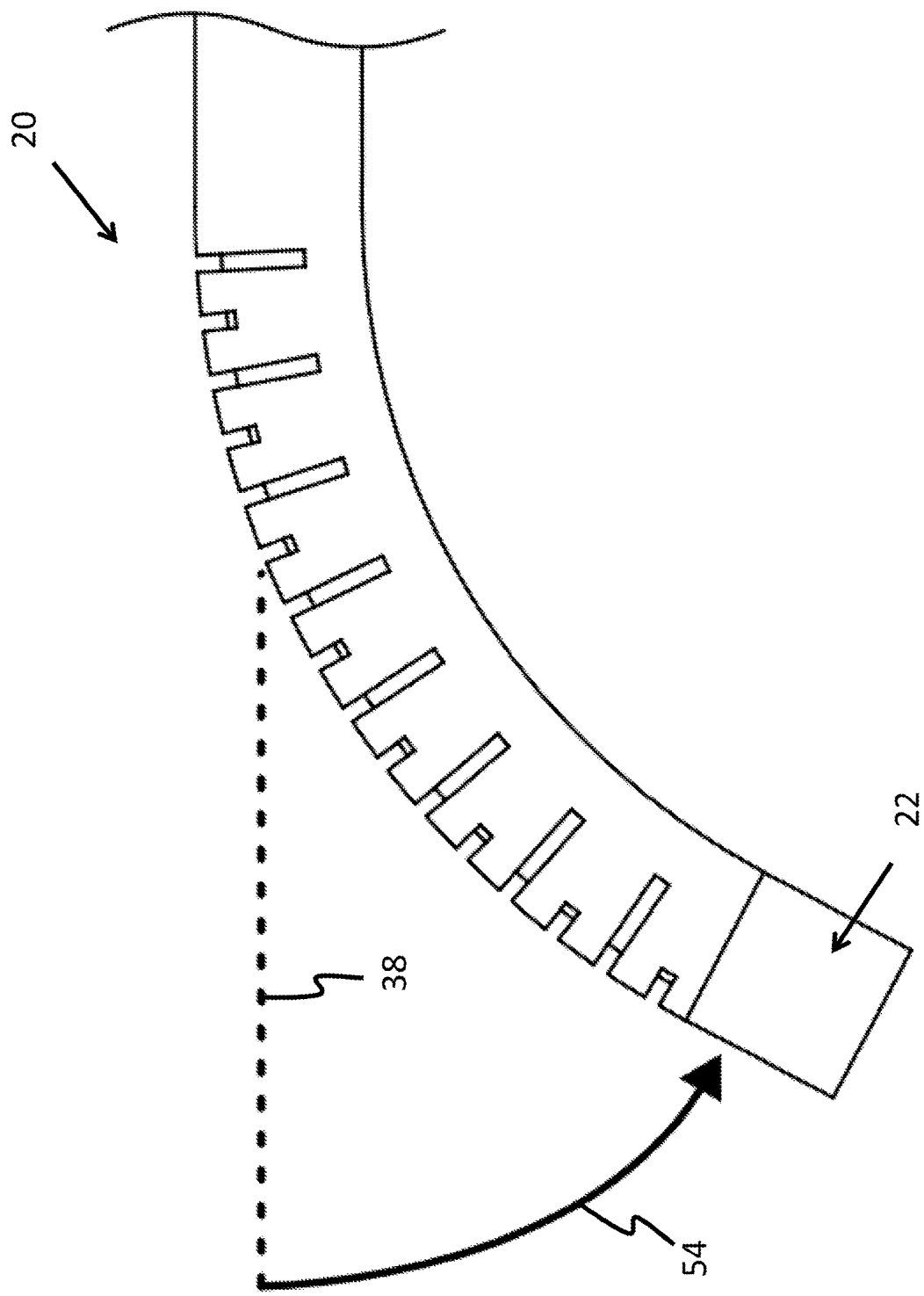
FIG. 8D is a detailed perspective view of the steerable tool of FIG. 8C, according to some embodiments of the present disclosure.

Referring particularly to FIGS. 6C and 6D, the push/pull directions along which the actuation force is applied are described with reference to the user. In particular, the actuation may be provided via a user interface 60, as described in greater detail below with reference to FIGS. 8A-8C. Actuation force applied in the "push" direction is therefore applied along the longitudinal axis 38 away from the user (e.g., toward the distal end 22 of the steerable tool 20). Actuation force applied in the "pull" direction is therefore applied along the longitudinal axis 38 toward from the user (e.g., away from the distal end 22 of the steerable tool 20). Following this convention, in FIG. 9C, a push force 57 is applied to the first flexible tube 28 (at its proximal end 29, for example) and a pull force 56 is applied to the second flexible tube 23 (at its proximal end 24, for example). Similarly, in FIG. 9D, a pull force 59 is applied to the first flexible tube 28 and a push force 58 is applied to the second flexible tube 23.

In some embodiments, and as generally depicted with reference to FIGS. 6C and 6D, the push/pull force applied to the first and second flexible tubes 28, 23 can be realized through the application of axial force on both tubes simultaneously. In other embodiments, and as depicted with reference to FIGS. 6E and 6F, the push/pull force applied to the first and second flexible tubes 28, 23 is relative and, therefore, can be realized through the application of axial force on one tube only. Therefore, the actuation forces applied to the proximal end 29 of the first flexible tube 28 and the proximal end 24 of the second flexible tube 23 as identified in FIGS. 6C and 6D can be realized through one of the identified push/pull force applications.

As a first example, and as depicted with particular reference to FIG. 6E, the steerable tool 20 can be actuated to form a bend such that the distal end 22 is steered along a path 55 by applying the pull force 59 to the proximal end 29 of the first flexible tube 28 while maintaining the second flexible tube 23 in a fixed axial position. Alternatively, such motion may be accomplished by applying the push force 58 to the proximal end 24 of the second flexible tube 23 while maintaining the first flexible tube 28 in a fixed axial position.

As a second example, and as depicted with additional reference to FIG. 6F, the steerable tool 20 can be actuated to form a bend such that the distal end 22 is steered along a path 54 by applying the push force 57 to the proximal end 29 of the first flexible tube 28 while maintaining the second flexible tube 23 in a fixed axial position. Alternatively, such motion may be accomplished by applying the pull force 59 to the proximal end 24 of the second flexible tube 23 while maintaining the first flexible tube 23 in a fixed axial position.

Figure 7A:
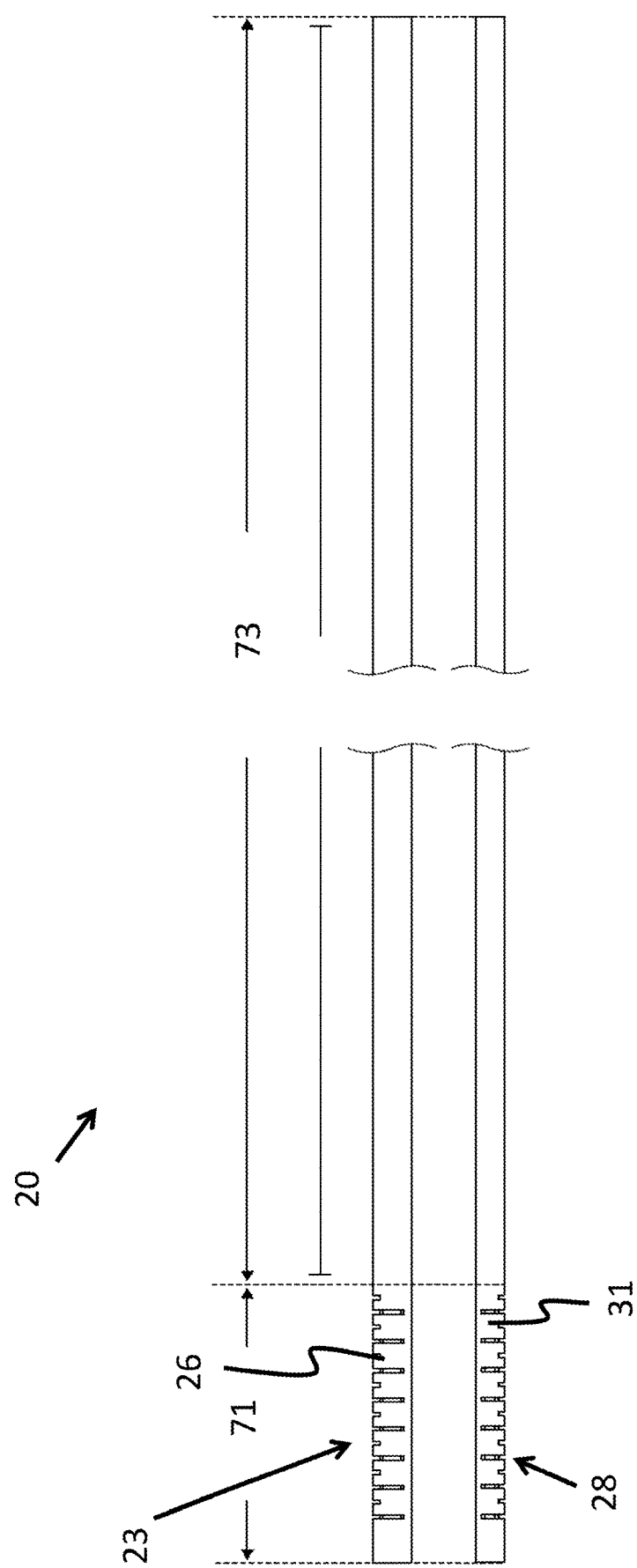
FIG. 7A is a side view of a first flexible tube and second flexible tube for a steerable tool, according to some embodiments of the present disclosure.
Figure 7B:
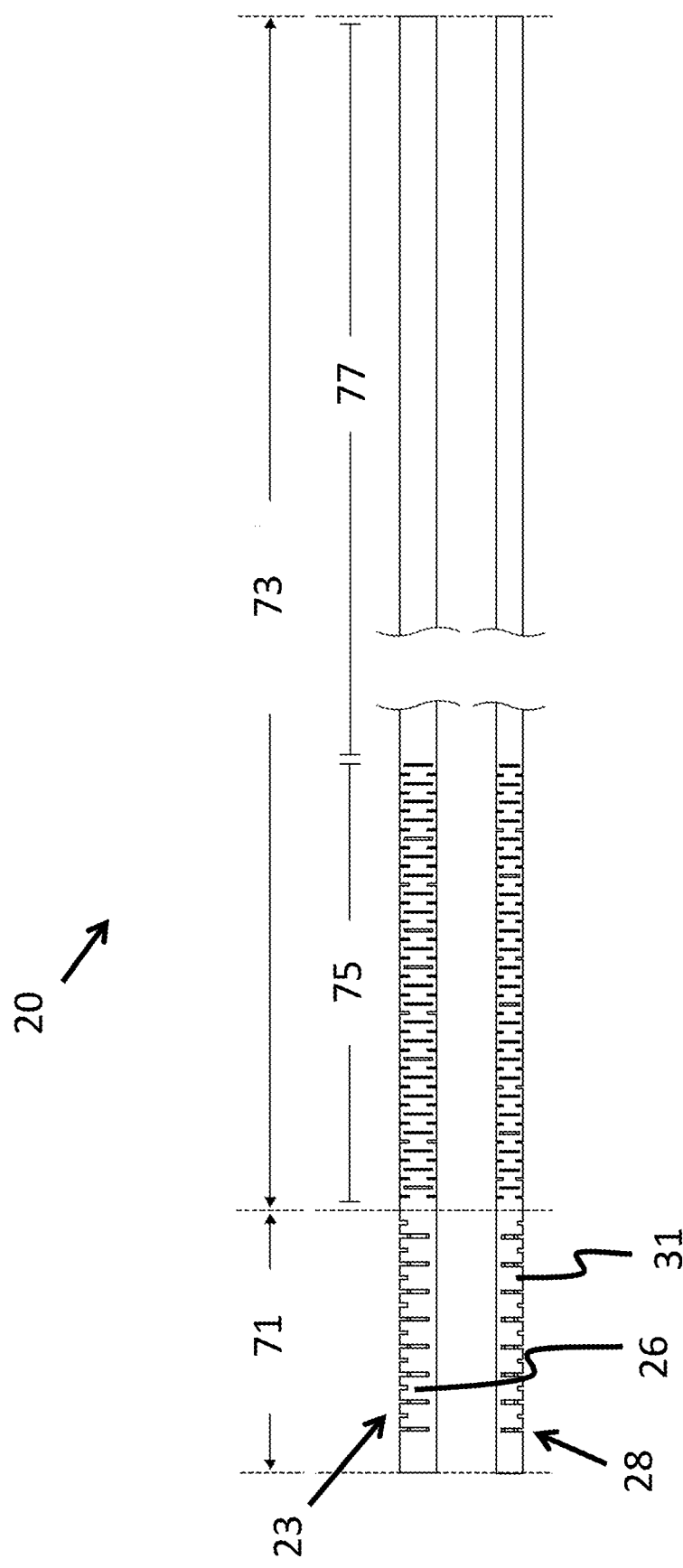
FIG. 7B is a side view of a first flexible tube and second flexible tube for a steerable tool, according to some embodiments of the present disclosure.
Figure 7C:
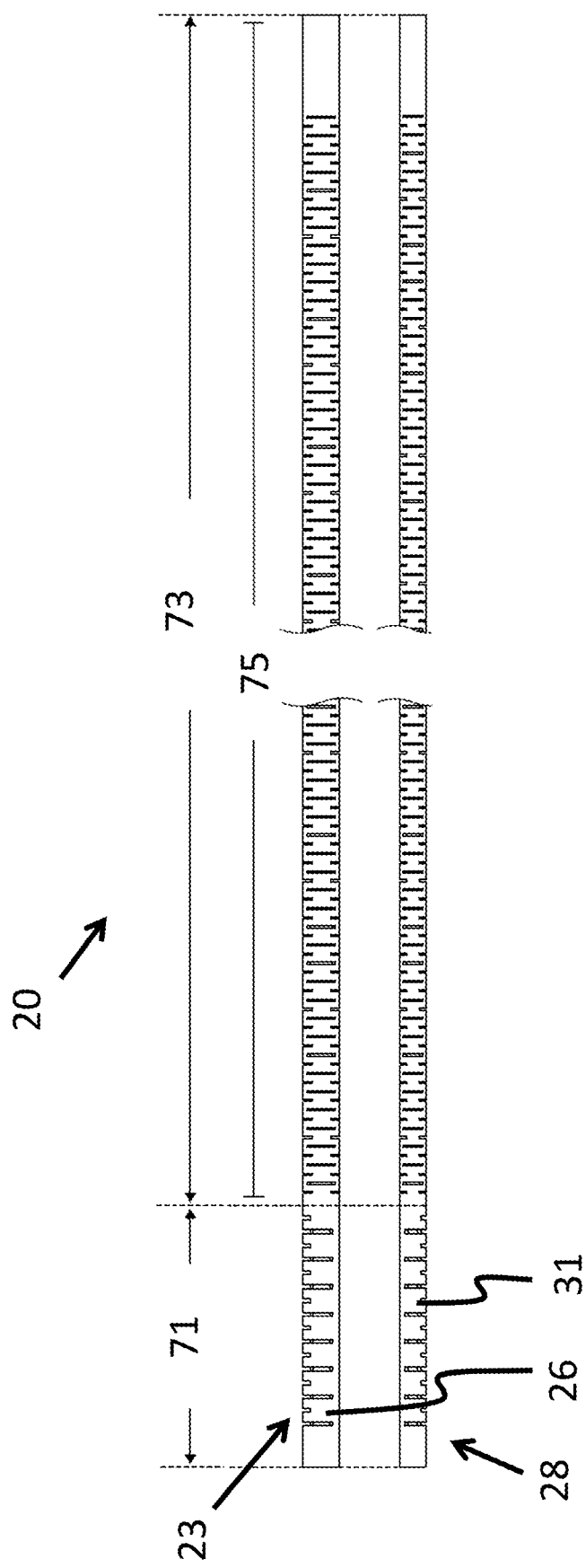
FIG. 7C is a side view of a first flexible tube and second flexible tube for a steerable tool, according to some embodiments of the present disclosure.

Referring now to FIGS. 7A-7C, the steerable tool 20 may include two or more sections. For example, the steerable tool 20 may include a steerable section 71 on a distal region of the steerable tool 20, which may include the deflectable portions 31, 26 of the first and second flexible tubes 28, 23. Accordingly, the steerable section 71 may be controlled by the user as described above.

In some embodiments, the steerable tool 20 further includes a transmission section 73 located proximal to the steerable section 71. The transmission section 73 may be a section of the steerable tool 20 that connects the steerable section 71 to via the user interface 60, as described in greater detail below with reference to FIGS. 8A-8C. Accordingly, the transmission section 73 may be configured to allow the user interface 60 to effectuate navigation of the distal end 22 of the steerable tool 20 through a route towards an anatomical region within the patient.

In some embodiments, the transmission section 73 is constructed from the same piece of tubing as the steerable section 71. In other words, the steerable and transmission sections 71, 73 may be formed as a single piece of material. In other embodiments, the transmission section 73 is a separate tube that is adhered or welded onto steerable section 71.

Referring particularly to FIG. 7A, in applications where the route to the anatomical region is primarily linear, the transmission section 73 may be rigid, solid tubing. Referring particularly to FIGS. 7B and 7C, in applications where the route to an anatomical region is more tortuous, the transmission section 73 may include a flexible section 75 and a rigid section 77. The rigid section 77 may be made from solid tubing. The rigid section 77 may be proximal to both the steerable section 71 and the flexible section 75 and can be used as a rigid end on which a linear force may be applied (via the user interface 60, for instance) to extend the steerable tool 20 through the route towards the anatomical region. In turn, the flexible section 75 may be flexible enough to conform to a tortuous pathway towards the anatomical region. As a first example, the aforementioned flexibility of the flexible section 75 may be achieved through a fabricated pattern or a multitude of slots laser-machined into the first and second flexible tubes 28, 23 in order to reduce their stiffness. As a second example, the aforementioned flexibility of the flexible section 75 may be achieved through the inclusion of a tube of a more flexible polymeric tubing (e.g., polyimide, PEBAX, Nylon, etc.). As a third example, the aforementioned flexibility of the flexible section 75 may be achieved by the same or similar methods used for providing the first and second deflectable portions 31, 26 of the first and second flexible tubes 28, 23, as described above. Depending on the implementation, one or both of the flexible section 75 and the rigid section 77 may include braid reinforcement.

Continuing to refer particularly to FIGS. 7B and 7C, the flexible section 75 may extend over a partial length of the transmission section 73 as shown with reference to FIG. 7B, or extend along a full or substantial length of the transmission section 73 as shown with reference to FIG. 7C. Depending on the implementation, the slot pattern that forms the flexible section 75 may be constant along the length of the flexible section, or it may vary along the length of the flexible section. This variation can be achieved by changing the spacing between subsequent slot sections (e.g., the pitch), or by increasing the arc length of each slot around the tube's circumference (e.g., the cut fraction). Such variation may be desirable depending on the anatomy being accessed. For example, it may be advantageous for a distal portion of the transmission section 73 to have a higher flexibility to better conform to the natural anatomy being accessed, and for a proximal section of the transmission section 73 to have a lower flexibility for better push-ability, torque-ability, and device control via the user interface 60.

Referring now to FIGS. 8A-8D, the apparatus 100 may include the user interface 60 coupled to the tube assembly 10, according to some embodiments of the present disclosure. For example, as discussed above, the steerable tool 20 of the apparatus 100 may be actuated to form a bend. Such actuation may be nominally effectuated by the user interface 60, which houses various control features that a physician or other operator may use to control the apparatus 100. As shown, the user interface 60 may be configured in a pistol-grip design formed by a handle 62.

In some embodiments, a thumb-actuated lever 65 may convert rotary motion (applied by the operator) into linear motion in the tube assembly 10 of the apparatus 100. This rotary motion may be generated by any number of rotary-to-linear mechanical transmissions, including a slider-crank mechanism, a scotch-yoke mechanism, or a rack and pinion mechanism. As a first example, by rotating the lever 65 in a first direction as shown with reference to FIG. 8A, the user interface 60 may be configured to convert the rotary motion of the lever 65 into a linear motion that applies the pull force 59 to the proximal end 29 of the first flexible tube 28 while maintaining the second flexible tube 23 in a fixed axial position (as depicted with reference to FIGS. 6D and 6E), thus actuating the steerable tool 20 to form a bend such that the distal end 22 is steered along the path 55, as shown with reference to FIG. 8B. As a second example, by rotating the lever 65 in a second direction as shown with reference to FIG. 8C, the user interface may be configured to convert the rotary motion of the lever 65 into a linear motion that applies the push force 57 to the proximal end 29 of the first flexible tube 28 while maintaining the second flexible tube 23 in a fixed axial position (as depicted with reference to FIGS. 6C and 6F), thus actuating the steerable tool 20 to form a bend such that the distal end is steered along the path 54, as shown with reference to FIG. 8D. In some embodiments, the apparatus includes a mechanical transmission that converts rotary motion to linear, or axial, translation between the first flexible tube 28 and the second flexible tube 23, such that the steerable tool 20 may be actuated to form a bend.

Figure 8E:
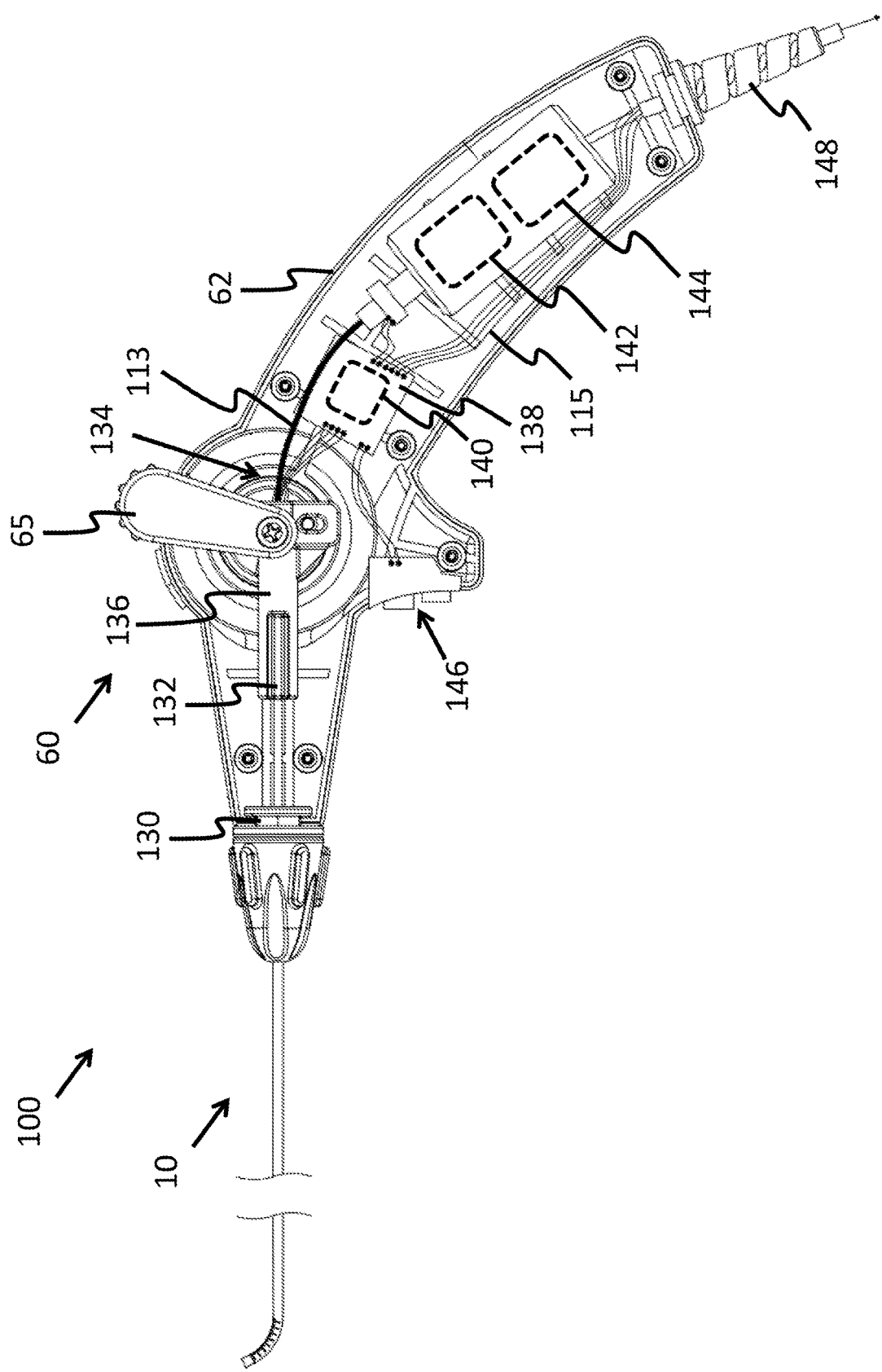
FIG. 8E is a cross-sectional view of a user interface of an endoscopic apparatus coupled to a tube assembly of an endoscopic apparatus, according to some embodiments of the present disclosure.

Referring particularly to FIG. 8E, a cutaway view of the user interface 60 is shown, according to some embodiments of the present disclosure. As shown, the second flexible tube 23 may be fixed to a stationary mounting bracket 130 within the handle 62, and the first flexible tube 28 may be attached to a sliding bracket 132 that forms part of a larger scotch-yoke transmission mechanism (where the lever 65 acts as a crank). When the lever 65 is rotated, a scotch-yoke transmission 134 may actuate the steerable tool 20 to form a bend.

As a first example, when the lever 65 is rotated in a counter-clockwise direction, the scotch-yoke transmission 134 may convert the rotation of the lever 65 into a rearward linear motion in the crank pin 136. The crank pin 136, in turn, may apply a rearward force on the sliding bracket 132, which may effectuate pulling and translating the first flexible tube 28 with respect to the stationary flexible tube 23. Accordingly, the sliding bracket 132 may apply the pull force 59 to the proximal end 29 of the first flexible tube 28 while the second flexible tube 23 is maintained in place, thus actuating the steerable tool 20 to form a bend such that the distal end 22 is steered along the path 55, as shown with reference to FIG. 8B.

As a second example, when the lever 65 is rotated in a clockwise direction, the scotch-yoke transmission 134 may convert the rotation of the lever 65 into a forward linear motion in a crank pin 136. The crank pin 136, in turn, may apply a forward force on the sliding bracket 132, which may effectuate pushing and translating the first flexible tube 28 with respect to the stationary second flexible tube 23. Accordingly, the sliding bracket 132 may apply the push force 57 to the proximal end 29 of the first flexible tube 28 while the second flexible tube 23 is maintained in place, thus actuating the steerable tool 20 to form a bend such that the distal end is steered along the path 54, as shown with reference to FIG. 8D. Of course, as suggested above, the scotch-yoke mechanism as described is one of many rotary-to-linear transmissions that can be used to convert the user's input force into an output bending motion in the steerable tool 20.

Figure 9:
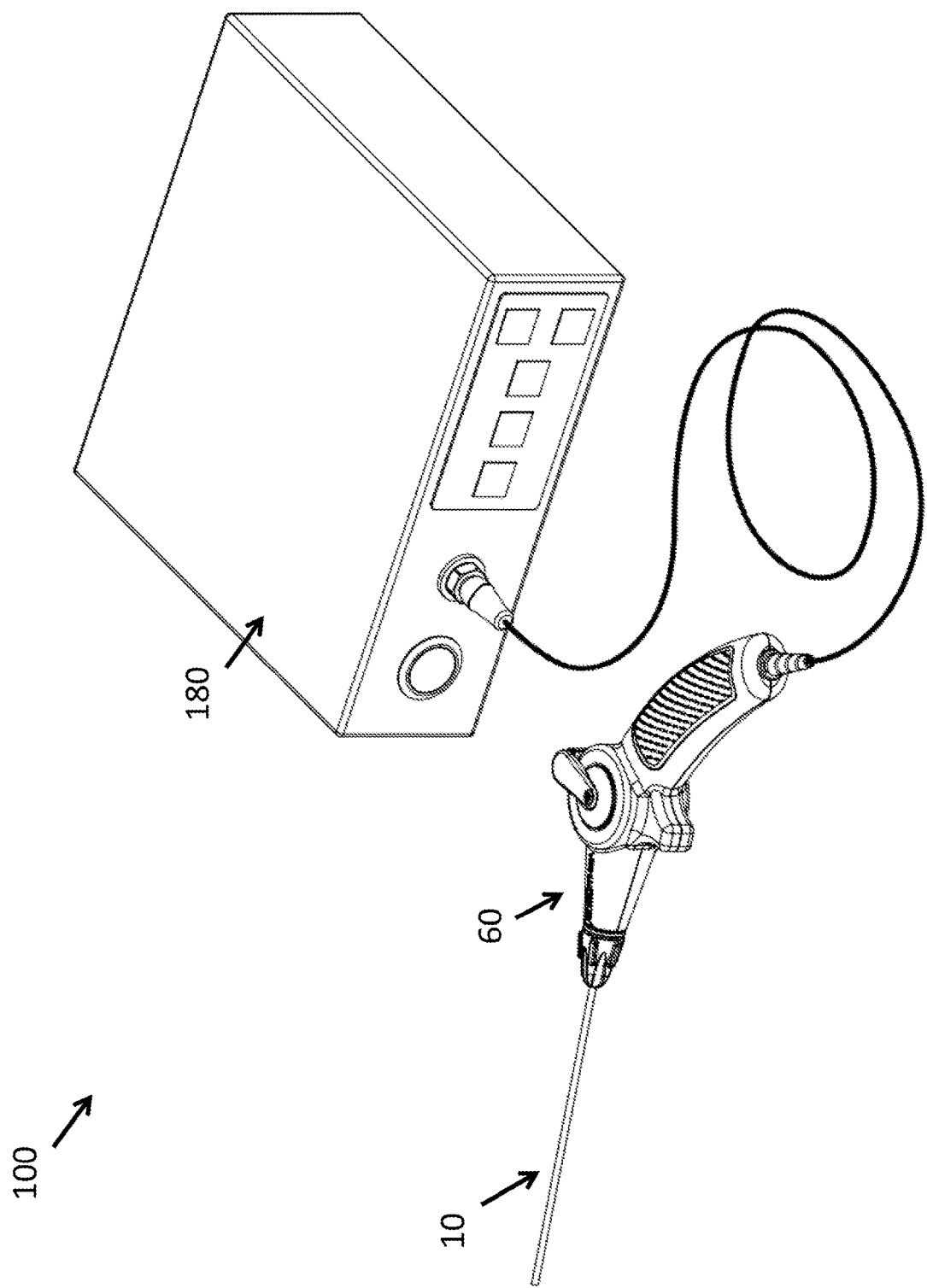
FIG. 9 is a perspective view of an endoscopic apparatus including a tube assembly coupled to a user interface, which is coupled to a control unit, according to some embodiments of the present disclosure.

Referring now to FIG. 9, the apparatus 100 may further include an external video processor, such an off-board processing and control unit (external control unit) 180 in electrical communication with the user interface 60, according to some embodiments of the present disclosure. In some embodiments, and with additional reference to FIG. 8E, the user interface 60 spatially locates, mechanically secures, and/or encapsulates necessary electronics to condition the signal generated by the image sensor 21 prior to passing the signal to the external control unit 180. For instance, the user interface 60 may include an on-board circuit board 138, which may include a memory 140. In some embodiments, the memory 140 is an on-board programmable read-only memory (e.g., electrically-erasable programmable read-only memory ("EEPROM"), etc.) which can be used to store a unique device identifier or timestamp information associated with the apparatus 100, which can subsequently be interrogated by the external control unit 180 in order to ensure device validity. Advantageously, interaction between the external control unit 180 and the memory 140 as discussed above may beneficially prevent device re-use or shelf life expiration of the apparatus 100 by enforcing a lockout period based on this unique device/time information associated with the apparatus 100. For example, if the apparatus 100 has a certain specified shelf life (e.g., two years), and a factory-programmed manufacturing timestamp indicates a manufacturing date more than two years in the past, the external control unit 180 may disable a display port thereon in order to prevent the apparatus 100 from being used past its expiration date. In another embodiment, the memory 140 may store a timestamp when it is first connected to the external control unit 180. The external control unit 180, after interrogating this timestamp and comparing with the current time, may enforce a device lockout after a certain time period has elapsed (i.e. 24 hours) to prevent the apparatus 100 from being re-used.

In some embodiments, the user interface 60 includes an LED 142. The LED 142 may generate the illumination required for operation of the one or more light sources 116. For instance, as mentioned above with reference to FIG. 14, the wiring 112 may include the optical fiber bundle 113. Accordingly, the LED 142 may provide illumination to the one or more light sources 116 via the optical fiber bundle 113. The LED 142 may be provided with sufficient wattage such that the one or more light sources 116 provide adequate illumination to the anatomical region, after thermal losses and optical losses along the optical fiber bundle 113 are accounted for. In other embodiments, the illumination required for operation of the one or more light sources 116 is generated by an off-board LED or incandescent bulb housed within the external control unit 180. In such cases, the off-board LED or incandescent bulb may be coupled to the coupled to the one or more light sources 116 via a fiber optic bundle that is passed through the user interface 60 (either separately from or integrated into the camera image sensor wiring bundle 115).

In some embodiments, the user interface 60 further includes a heat sink 144. The heat sink 144 may be sized to ensure sufficient thermal removal such that the surface temperature of the heat sink 144 (and any component or aspect of the user interface 60 in direct contact with the heat sink 144) does not exceed a specified threshold for safe hand-held operation (e.g., forty-one degrees Celsius). For instance, the LED 142 may be mechanically and thermally coupled to the heat sink 144. The heat sink 144 may be affixed within the handle 62 of the user interface 60 via fasteners or an epoxy compound with adequate insulation properties.

In some embodiments, the user interface 60 includes programmable buttons 144 which can be used to control various image capture functions and video settings (i.e. white balance adjust, auto-gain adjust) related to the operation of the image sensor 114.

In some embodiments, wiring (which may include or interface with the wiring 112 or components thereof) exits the user interface through a strain relief 148, ultimately terminating at the external control unit 180 for further signal conditioning, conversion and digitization. The connector that connects the user interface 60 to the external control unit 180 may include a radio frequency identification (RFID) tag that gets interrogated by an RFID reader/antenna in the external control unit 180, and enforces a lockout if a compatible RFID tag is not detected. In some embodiments, the wiring exiting the user interface 60 is provided with adequate slack such that, during operation of the apparatus 100 as provided herein, such wires are not put under tension.

Depending on the implementation, the external control unit 180 may include one or more of a wired connection to the user interface 60, on-board power regulation (to convert the AC voltage supplied by the electrical grid to a suitable DC voltage), video processing and digital conversion circuitry (including, in some embodiments, software-based image interpolation to produce higher resolution than the native resolution of the image sensor 114), video outputs to external monitors, and/or frame grabbers in any number of different formats (HDMI, VGA, DVI, DisplayPort, S-Video, etc.). The external control unit 180 may further include various buttons/control inputs to allow a user to calibrate the image sensor, control the video's appearance, and/or modify video and image capture parameters (including but not limited to device power, illumination brightness, white balancing, resolution, auto-gain/exposure, image capture and recording).

As mentioned above with reference to FIG. 14, the optical fiber bundle 113 may be configured to deliver light from an off-board light source to the one or more light sources 116. Such off-board light sources may be housed within the external control unit 180. In such embodiments, the external control unit 180 may include a power source configured to supply power to the image sensor and the one or more light sources, including to provide adequate electrical power to the illumination source. The power source can include any suitable AC or DC power supply such as but not limited to one or more batteries or external or internal power interfaces. Additionally, the external control unit 180 may include an illumination LED or incandescent bulb that is optically coupled to the one or more light sources 116 via the optical fiber bundle 113.

In some embodiments, the external control unit 180 includes on-board memory for storing files such as video recordings, image captures, and snapshots as recorded by the user via the image sensor 114, and a means of extracting such stored files (either by writing to an external storage medium, such as an external hard disk or SD card, or through serial transfer via universal serial bus ("USB") connection). In other embodiments, the external control unit 180 acts as a pass-through to an external video/image capture and storage system, such as a frame grabbing system, via wired or wireless data transmission. The external control unit 180 may also include indicators that communicate status and fault states associated with the device 400, both visually (e.g., status LEDs, pilot lights, etc.) and audibly (e.g., alarm tones, etc.). As mentioned previously, the external control unit 180 may include RFID reader/antenna to interrogate any devices that are connected to the external control unit 180 in order to determine compatibility and enforce lockout if compatibility is not confirmed.

Figure 10:
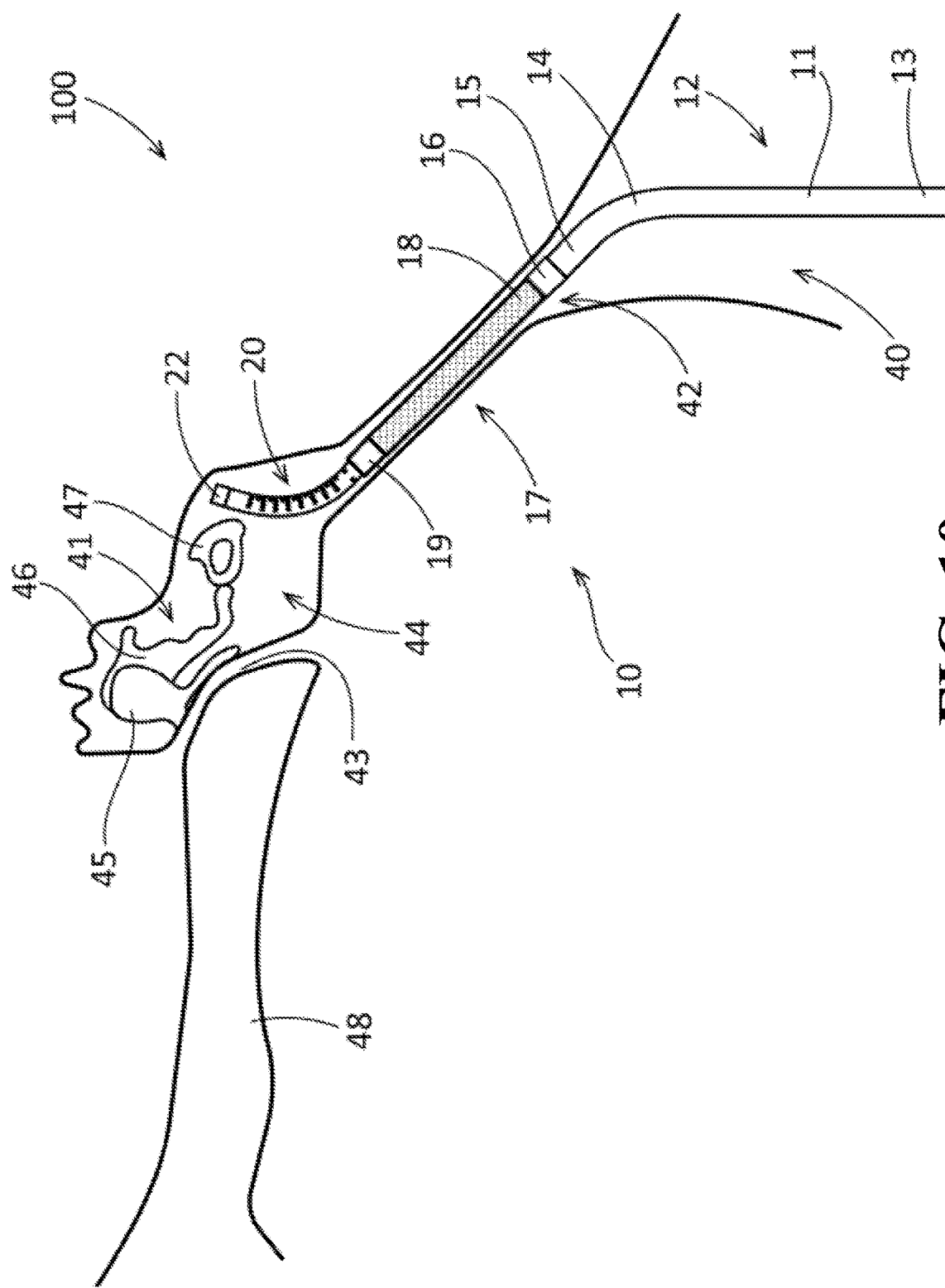
FIG. 10 is a schematic view of a tube assembly for an endoscopic apparatus for middle ear access, according to some embodiments of the present disclosure.
Figure 11:
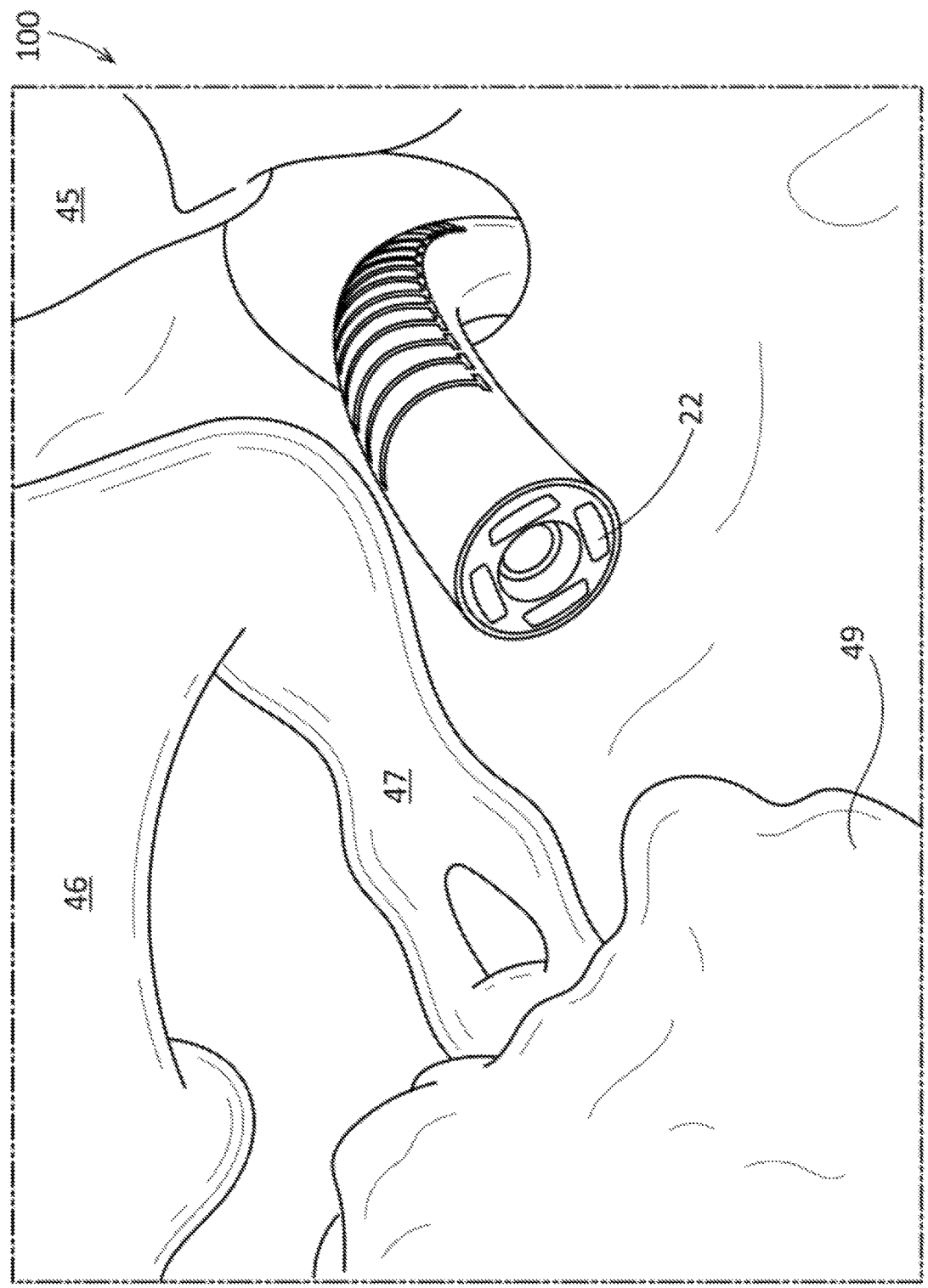
FIG. 11 is a detailed perspective view of the tube assembly of FIG. 10 being operated to access a middle ear cavity, according to some embodiments of the present disclosure.

Referring now to FIGS. 10-11, the apparatus may be further configured particularly for accessing a middle ear cavity 44 via a Eustachian tube 42 and a nasal passageway 40, according to various embodiments of the present disclosure. For instance, using the nasal passageway 40 as an entrance to the body of a patient, at least a portion of the tube assembly 10 (the distal end 22 of the steerable tool 20, for example) may access the middle ear cavity 44 non-surgically in order to facilitate diagnosis and surveillance of middle ear disease as identifiable therein.

As discussed above, the steerable tool 20 may be actuable (e.g., controllable, displaceable, translatable, rotatable) to form a bend (e.g., curve, deflection, etc.), such that the distal end 22 is steered (e.g., deflected) toward an anatomical region within the middle ear cavity 44 or other anatomical region. For example, and with particular reference to FIG. 11, the distal end 22 may be steered toward a cholesteatoma 49 located within the middle ear cavity 44.

As described in greater detail below with reference to FIG. 12, the tube assembly 10 (including the steerable tool 20 as discussed above) may be provided as an assembly of three or more concentrically nested, telescoping tubes that are operable to perform a multi-stage deployment (as discussed below with reference to FIGS. 13-16) in order to access the middle ear cavity 44. For instance, the tube assembly 10 may include, in addition to the steerable tool 20, a rigid tube 12 and a third flexible tube 17. As described in greater detail below, the third flexible tube 17 may be a flexible catheter, and the rigid tube 12 may be a rigid cannula.

By accessing the middle ear cavity 44 as shown, the methods and apparatuses provided for herein may provide access to the middle ear cavity 44 without the drawbacks associated with the conventional surgical process of creating of a hole in an ear canal 48 and displacing an eardrum 43 and ossicular chain 41 (which includes a malleus 45, incus 46, and stapes 47) in order to gain similar access to the middle ear cavity 44.

Figure 12:
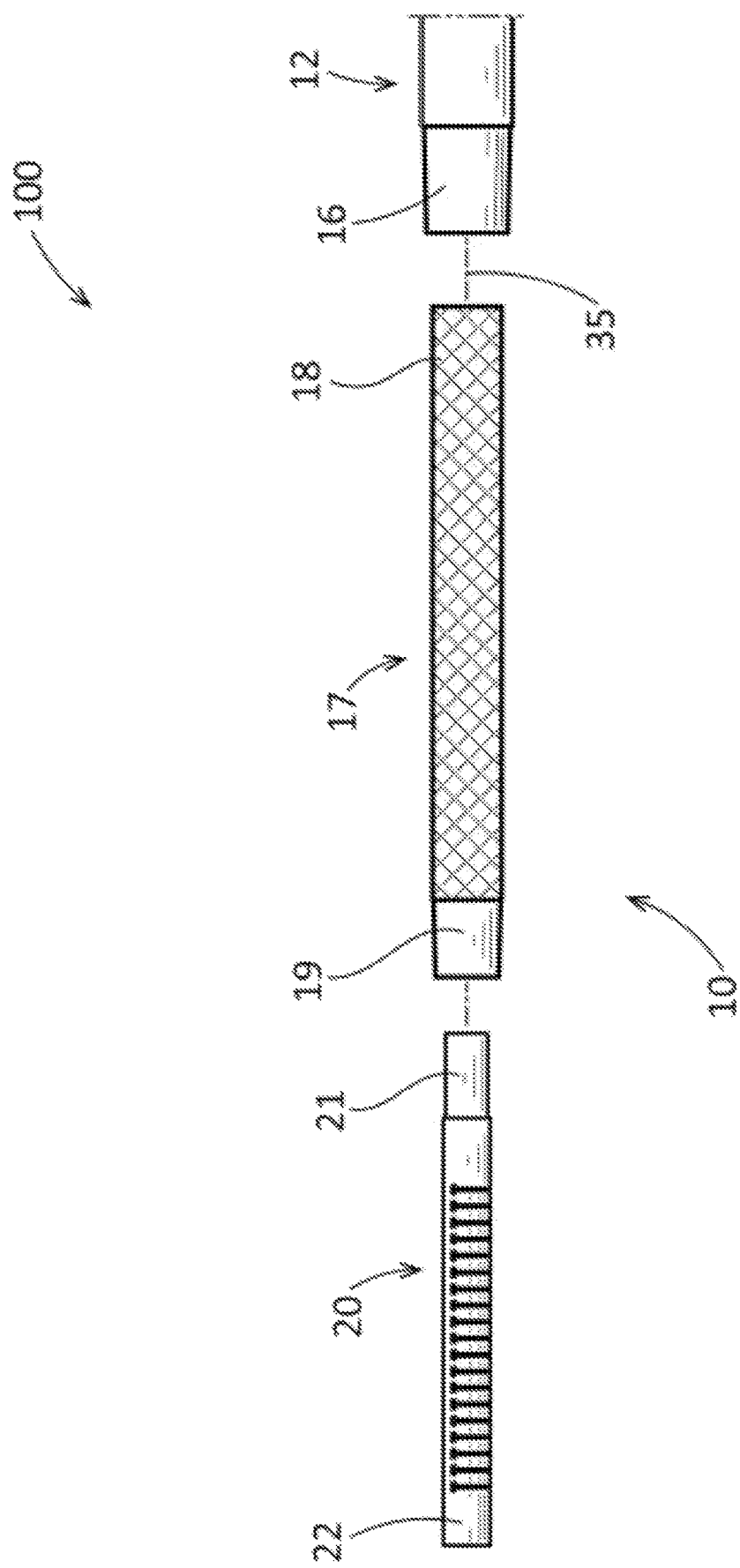
FIG. 12 is an exploded view of the tube assembly of FIG. 10, according to some embodiments of the present disclosure.

Referring now to FIG. 12, the tube assembly 10 as configured for middle ear access is shown in an exploded view, according to some embodiments of the present disclosure. As mentioned above, the tube assembly 10 includes the rigid tube 12, the third flexible tube 17, and the steerable tool 20. Each of the rigid tube 12 and third flexible tube 17 include an inner lumen through which a component of the apparatus 100 may pass. In some embodiments, the steerable tool 20 additionally includes an inner lumen through which various components of the apparatus 100 may pass, such as the image sensor assembly 102 as discussed above.

In some embodiments, in order to facilitate the staged deployment of the apparatus 100 as described herein, the rigid tube 12 includes an inner lumen extending from a proximal end 13 (as shown with reference to FIG. 1) to a distal end 16. Similarly, the third flexible tube 17 may include an inner lumen extending from a proximal end 18 to a distal end 19. The third flexible tube 17 may be disposed within the inner lumen of the rigid tube 12 and be axially movable (e.g., along an axis 35 defined by at least a portion of the rigid tube 12) relative to the rigid tube 12, such that at least a portion of the third flexible tube 17 projects out of an opening formed by the distal end 16 of the rigid tube 12, as shown below with reference to FIG. 14. Similarly, the steerable tool 20 may be disposed within the inner lumen of the third flexible tube 17 and be axially movable relative to the third flexible tube 17, such that at least a portion of the steerable tool 20 projects out of an opening formed by the distal end 19 of the third flexible tube 17, as shown below with reference to FIGS. 6 and 7.

Figure 13:
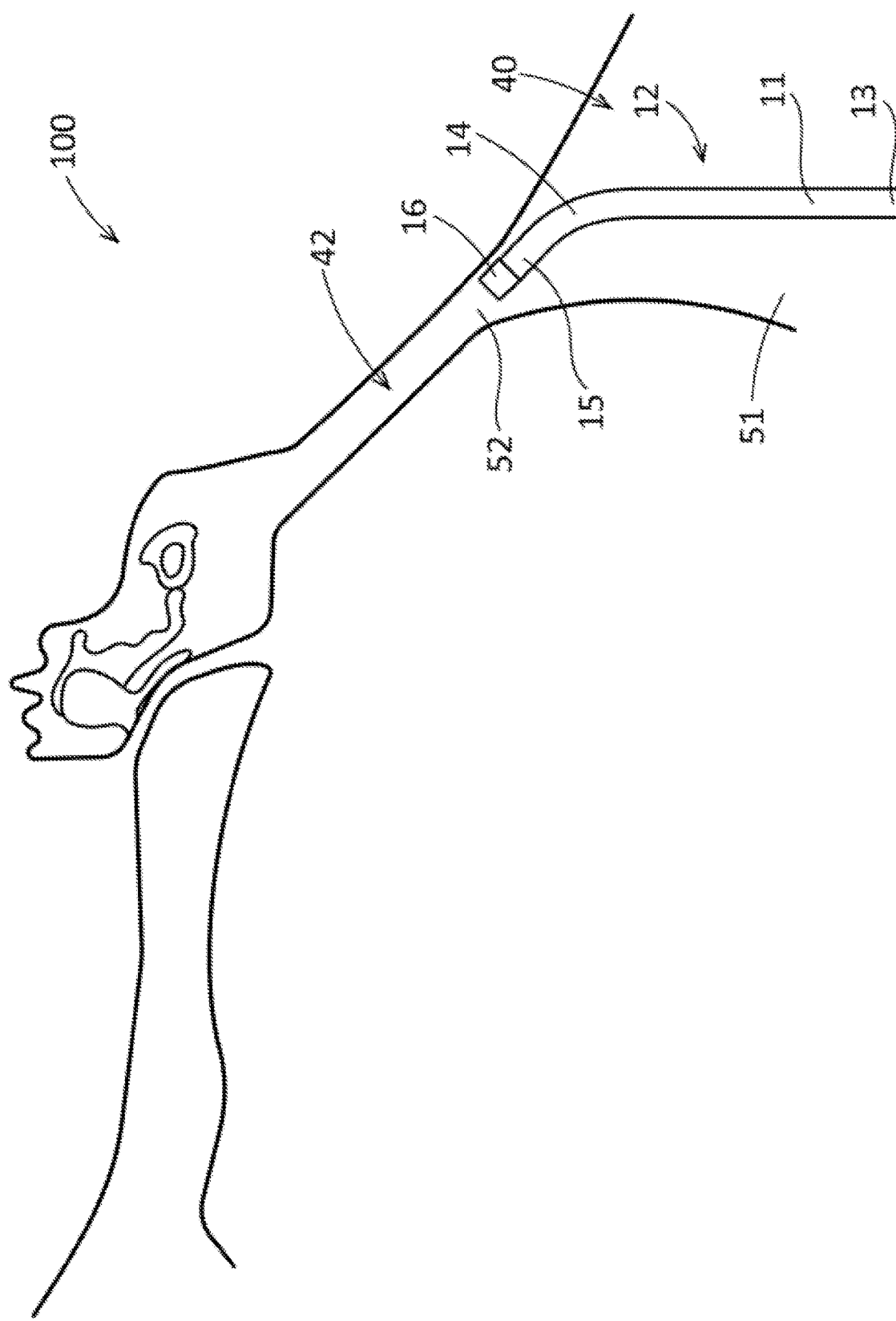
FIG. 13 is a schematic view of a rigid tube of the tube assembly of FIG. 10 interacting with a nasal passageway during a first stage of deployment of the apparatus of FIG. 10, according to some embodiments of the present disclosure.

Referring now to FIG. 13, an embodiment of the apparatus 100 as configured for middle ear access is shown, according to some embodiments of the present disclosure. In particular, FIG. 13 depicts a first stage of the multi-stage deployment of the tube assembly 10 when configured as discussed above with reference to FIG. 12. As described in greater detail below, the first stage may involve providing or positioning at least a portion of the rigid tube 12 within the nasal passageway 40, which interfaces with the middle ear cavity 44 via the Eustachian tube 42 intermediate the nasal passageway 40 and the middle ear cavity 44.

Thus, in some embodiments, the rigid tube 12 may be inserted and navigated into an entrance 52 of the Eustachian tube 42. For example, the rigid tube 12 may be extended into, or positioned within, an entrance 51 of the nasal passageway 40 (e.g., a nostril of the patient) and into the nasal passageway 40, until a distal portion of the rigid tube 12 is aligned with an entrance 52 of the Eustachian tube, as described in greater detail below. Thus, the rigid tube 12 may form a nasopharyngeal conduit that bridges the entrance 51 of the nasal passage 40 to the entrance 52 of the Eustachian tube 42.

In some embodiments, the rigid tube 12 has a pre-formed curvature that forms an angle between a first axis defined by a distal portion of the rigid tube 12 and a second axis defined by a proximal portion of the rigid tube 12. In some embodiments, the angle is obtuse and is between about one-hundred and ten degrees and about one-hundred and sixty degrees, as shown in FIG. 13. Alternatively, the angle may be described as an acute angle of about twenty to seventy degrees between the proximal portion of the rigid tube 12 and a proximal extension of a longitudinal axis of the distal portion of the rigid tube 12 projecting toward the proximal portion of the rigid tube 12 in some embodiments. In other words, the rigid tube 12 includes a pre-curved portion 14 located between the distal end 16 and the proximal end 13, and the rigid tube 12 may include one or more straight (or substantially straight) portions located on either end of the pre-curved portion 14. For example, a proximal portion 11 of the rigid tube 12 (extending between the pre-curved portion 14 and the proximal end 13) may be straight. Further, the rigid tube 12 may also include a straight distal portion 15 extending between the pre-curved portion 14 and the distal end 16. The pre-curved portion 14 of the rigid tube 12 may allow a user (e.g., a surgeon, doctor, operator, etc.) to align the distal end 16 (and, in some embodiments, the distal portion 15) with an axis of the Eustachian tube 42, particular where the Eustachian tube forms the entrance 52.

The rigid tube 12 may be a rigid tube constructed of any suitable material including, but not limited to, rigid metal commonly used in the construction of medical devices (e.g., Stainless Steel, Titanium, etc.), and a biocompatible polymer with adequate rigidity. The rigid tube 12 may further include a low-friction inner liner concentrically disposed within an outer layer of the rigid material mentioned above. The inner liner may facilitate the extension of the third flexible tube 17 through the inner lumen of the rigid tube 12. The inner liner may be constructed of any suitable material including, but not limited to, Polytetrafluoroethylene (PTFE). The rigid tube 12 may further include markings or fiducial features to aid the user in inserting the rigid tube 12 to the appropriate depth within the nasal passageway 40 and/or the Eustachian tube 42. The rigid tube 12 may further include materials and/or lubricants disposed on an outer surface of the layer of rigid material in order to enhance lubricity. Such materials and/or lubricants may include, but are not limited to, hydrophilic coating, electropolishing, electroplating, and/or a thin PTFE jacket.

In order to be inserted within the nasal passage 40, the rigid tube 12 may form an outer diameter of equal to or less than about four millimeters, and be long enough to extend between the entrance 51 of the nasal passageway 40 and the entrance 52 of the Eustachian tube 42. The pre-curved portion 14 may form an angle between the axes defined by the proximal portion 11 and the distal end 16 (and distal portion 15, in some embodiments) of about twenty degrees to about seventy degrees. Such an angle may allow for the rigid tube 12 to accommodate an angle formed between the axis of the Eustachian tube 42 and a sagittal plane defined by the anatomy of the patient. In various embodiments, the pre-curved portion 14 defines a compound curve or a series of curves, rather than a single steady curve as generally depicted herein.

The distal end 16 of the rigid tube 12 may be constructed of any suitable material including, but not limited to, a transparent polymeric material (e.g., PTFE), such that the third flexible tube 17 and/or any markings or fiducial features thereon could be seen through the distal end 16. In some embodiments, the distal end 16 may be constructed in order to allow for atraumatic contact with the patient (e.g., the various surfaces of the nasal passageway 40 and/or Eustachian tube 42). For example, the distal end 16 may be constructed of a softer material including, but not limited to, PEBAX 70D. Further, the distal end 16 may feature a swaged outer-diameter to facilitate atraumatic contact while a user aligns the tube assembly 10 with the entrance 52 of the Eustachian tube 42.

The proximal portion 11 of the rigid tube 12 may terminate in a hub (such as a hub 68 depicted in greater detail below with reference to FIG. 10). For example, the hub may be coupled to the proximal portion 11 at the proximal end 13 of the rigid tube 12.

Figure 14:
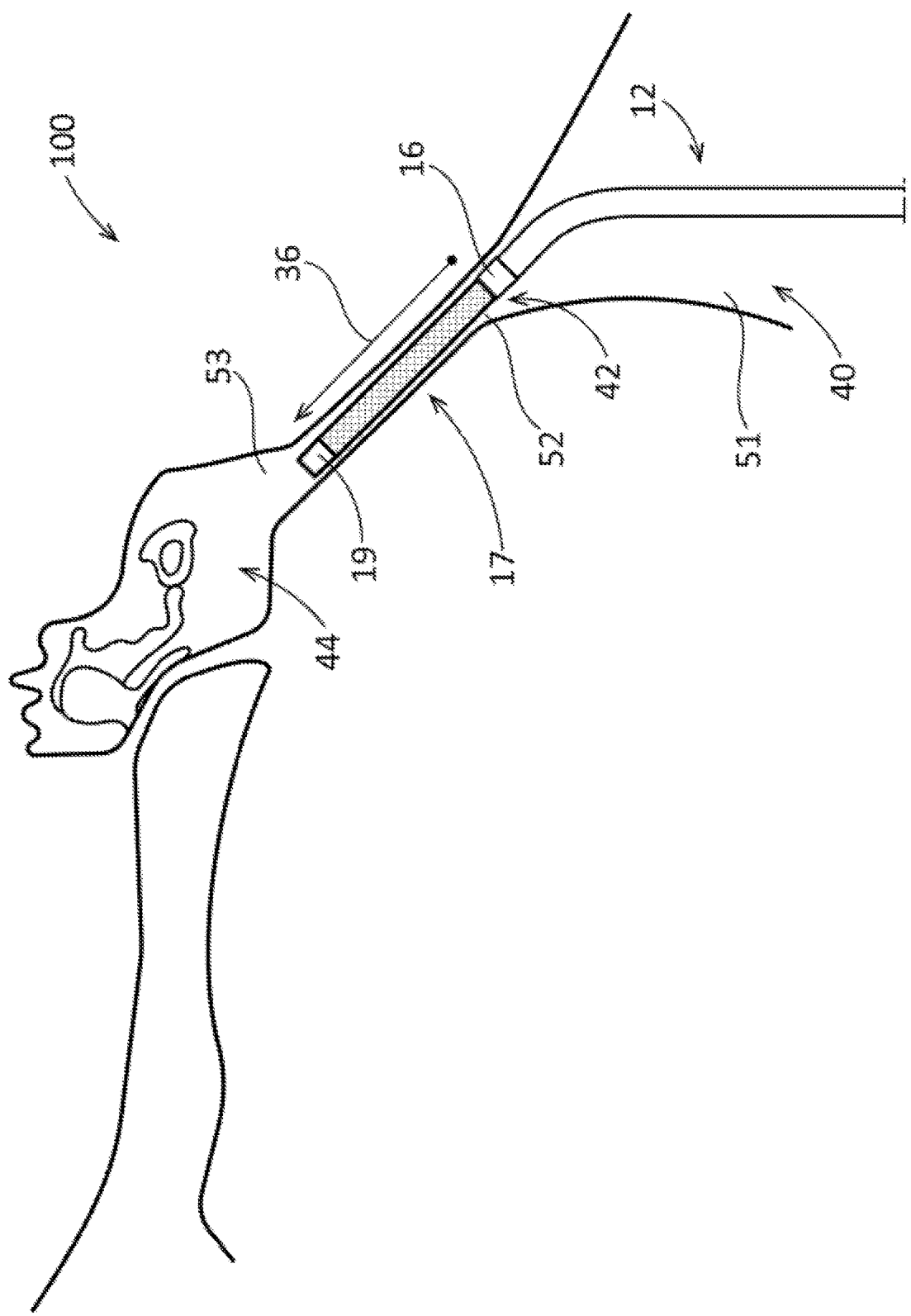
FIG. 14 is a schematic view of the tube assembly of FIG. 10 interacting with a Eustachian tube during a second stage of deployment of the apparatus of FIG. 10, according to some embodiments of the present disclosure.

Referring now to FIG. 14, an embodiment of the apparatus 100 as configured for middle ear access is shown, according to some embodiments of the present disclosure. In particular, FIG. 14 depicts a second stage of the multi-stage deployment of the tube assembly 10 mentioned above. As described in greater detail below, the second stage may involve extending the third flexible tube 17 through an inner lumen of the rigid tube 12, such that at least a portion of the third flexible tube 17 projects out of an opening formed by a distal end of the rigid tube 12, and that a distal end of the third flexible tube 17 is displaced along the Eustachian tube 42 toward the middle ear cavity 44.

Thus, in some embodiments, the third flexible tube 17 is extended through (e.g., moved axially relative to) the inner lumen of the rigid tube 12, projecting out of the opening formed by the distal end 16 of the rigid tube 12 in a direction 36 and along the Eustachian tube 42 from the entrance 52 of the Eustachian tube 42 to the entrance 53 of the middle ear cavity 44.

The third flexible tube 17 may be a third flexible tube (denoted as a "first" flexible tube in order to differentiate from "second" and "third" flexible tubes that may be included in the steerable tool 20 as discussed below) flexible enough to traverse the pre-curved portion 14 of the rigid tube 12 without incurring material yield. In some embodiments, the third flexible tube 17 includes a tube constructed of a single, flexible material. For example, the single, flexible material may be any suitable material including, but not limited to, latex, silicone, Teflon, and a metal that has been laser-cut to reduce the flexural stiffness of the material (e.g., Nitinol, Stainless Steel, Titanium, etc.). In other embodiments, the third flexible tube 17 includes a tube constructed of two or more layers of different materials. For example, the third flexible tube 17 may include a lubricous liner layer and a layer of braided material in order to reinforce the integrity of the lubricous liner layer. The lubricous liner layer may be constructed of any suitable material including, but not limited to, PTFE. The layer of braided material may be constructed of any suitable material including, but not limited to, Stainless Steel, Nitinol, and Kevlar. In such implementations, the third flexible tube 17 may further include a jacket layer of material disposed about the layer of braided material in order to provide a smooth, atraumatic surface of the third flexible tube 17. The jacket layer may be constructed of any suitable material including, but not limited to, Nylon, Polyimide, and Polyether block amide (e.g., PEBAX).

In order to extend along the Eustachian tube 42, the third flexible tube 17 may have an outer diameter of equal to or less than about three millimeters, and have an overall length that is enough to project out of the opening formed by the distal end 16 of the rigid tube 12 by between about twenty millimeters and about forty millimeters in some embodiments. In further embodiments, the third flexible tube 17 may have any suitable outer diameter to correspond to the anatomical dimension of the patient, and this dimension may vary from patient to patient. In some embodiments, the outer diameter of the third flexible tube 17 is between about one and about four millimeters.

In some embodiments, the distal end 19 of the third flexible tube 17 may be constructed of a softer material (relative to the material constructing the general body of the third flexible tube 17 discussed above) that allows for atraumatic contact with the patient (e.g., the various surfaces of the Eustachian tube 42, including the entrance 52, the entrance 53 of the middle ear cavity 44, etc.). Further, the distal end 19 may feature an atraumatic tip, constructed of a softer material (e.g., PEBAX 70D) with a swaged outer-diameter to facilitate alignment with the entrance 53 of the middle ear cavity 44.

In some embodiments, the third flexible tube 17 further includes materials and/or lubricants disposed on an outer surface in order to enhance lubricity. Such materials and/or lubricants may include, but are not limited to, hydrophilic coating, electropolishing, electroplating, and/or a thin PTFE jacket. The third flexible tube 17 may include a low-friction inner liner (constructed of PTFE, for example) in order to facilitate the passage of the steerable tool 20 through the inner lumen of the third flexible tube 17. In some embodiments, the third flexible tube 17 includes markings or fiducial features printed at various locations along the length of the third flexible tube 17 in order to aid the user in inserting the third flexible tube 17 to the appropriate depth within the Eustachian tube 42 (reaching the entrance 53 of the middle ear cavity 44, for example).

In some embodiments, the third flexible tube 17 may feature variable flexural stiffness (e.g., stiffness modulation) along the length of the third flexible tube 17. For instance, it may be advantageous for the proximal section of the third flexible tube 17 (e.g., the region of the third flexible tube 17 closer to the proximal end 18) to be stiffer to aid in push-ability and torque-ability, while making a distal section of the third flexible tube 17 (e.g., the region of the third flexible tube 17 closer to the distal end 19) more flexible and softer, such that it better conforms with the pre-curved portion 14 of the rigid tube 12 and the Eustachian tube 42.

In some embodiments, such variable flexural stiffness along the length of the third flexible tube 17 is provided by increasing or decreasing a density of braided material along the length of the third flexible tube 17. For example, as mentioned above, the third flexible tube 17 may include a layer of braided material, a liner layer, and/or a jacket layer. Such density of braided material may be considered as a number of crosses in the braided material per inch, or per-inch-crosses ("PIC"). Changing the PIC while holding all other parameters constant (e.g., the jacket and/or liner material and thickness, the diameter of the third flexible tube 17, etc.) may have an effect of modifying the flexural stiffness properties of the third flexible tube 17 or the proximal and distal sections thereof.

In other embodiments, such variable flexural stiffness along the length of the third flexible tube 17 is provided by utilizing a higher-durometer material as the jacket in the proximal section of the third flexible tube 17, and thermally bonding it to a lower-durometer material in the distal section of the third flexible tube 17. In other embodiments still, such variable flexural stiffness along the length of the third flexible tube 17 is provided by nesting the proximal section 80 of the third flexible tube 17 within a thin-walled metallic (e.g., Stainless Steel) hypotube.

Figure 15:
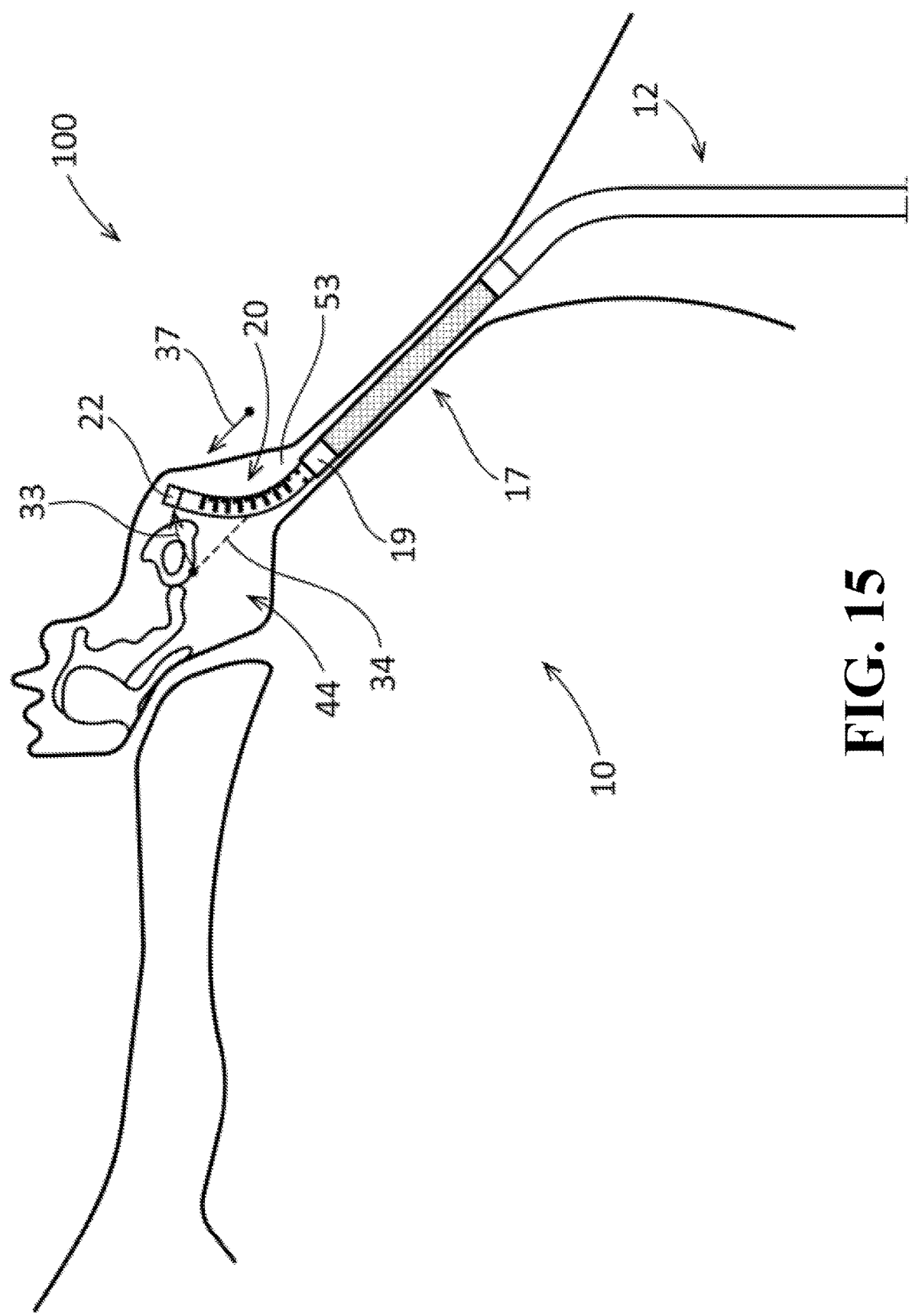
FIG. 15 is a schematic view of the tube assembly of FIG. 10 interacting with a middle ear cavity during third and fourth stages of deployment of the apparatus of FIG. 1, according to some embodiments of the present disclosure.
Figure 16:
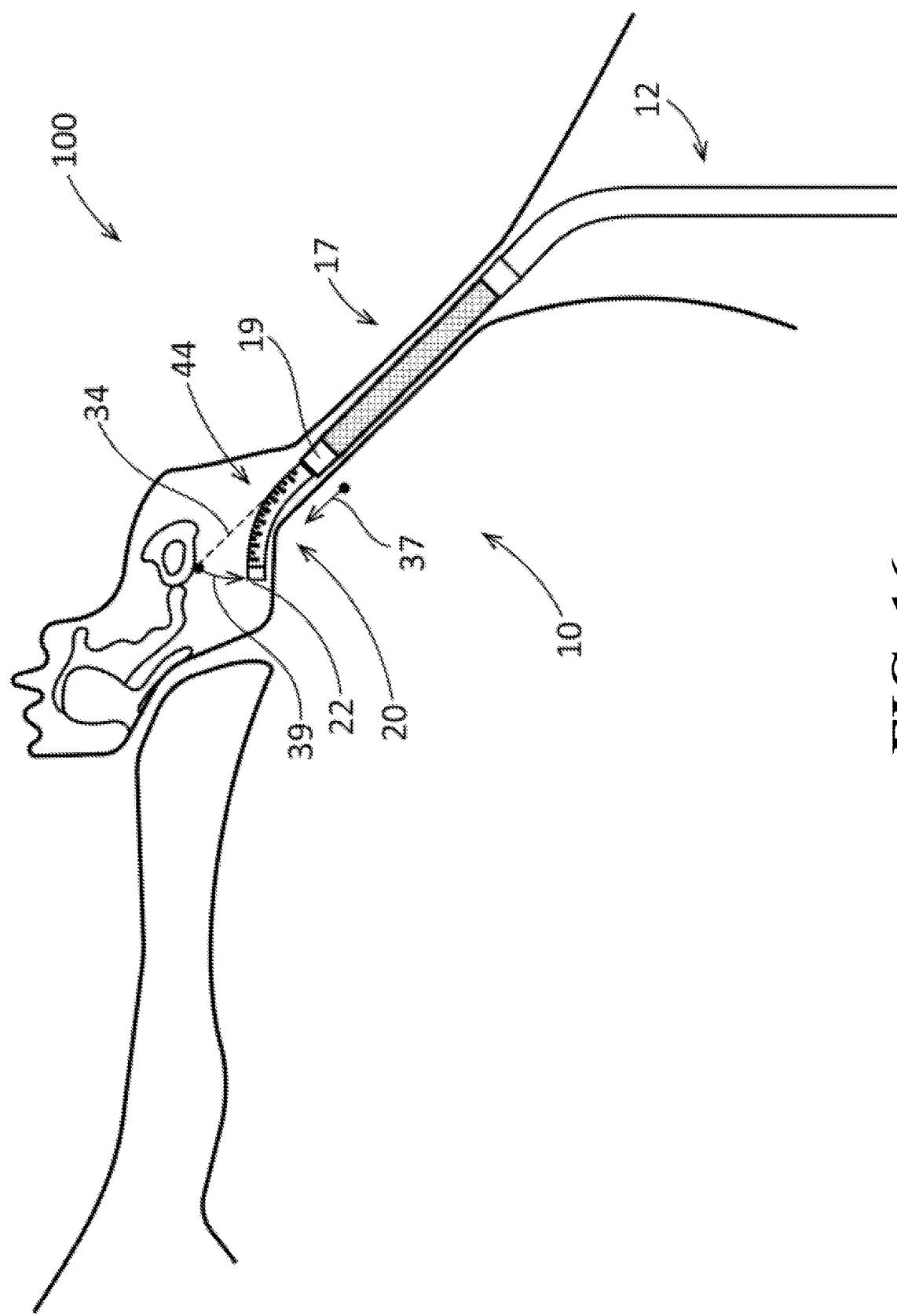
FIG. 16 is a schematic view of the tube assembly of FIG. 10 interacting with a middle ear cavity during third and fourth stages of deployment of the apparatus of FIG. 10, according to some embodiments of the present disclosure.

Referring to FIGS. 15 and 16, an embodiment of the apparatus 100 as configured for middle ear access is shown, according to some embodiments of the present disclosure. In particular, FIGS. 15 and 16 each depict third and fourth stages of the multi-stage deployment of the tube assembly 10 as mentioned above. The third stage of deployment may involve extending the steerable tool 20 through an inner lumen of the third flexible tube 17, such that at least a portion of the steerable tool 20 projects out of an opening formed by the distal end of the third flexible tube, and that a distal end of the steerable tool 20 is positioned within the middle ear cavity 44. The fourth stage of deployment may involve actuating the steerable tool 20 to form a bend, such that the distal end 22 of the steerable tool 20 is steered toward an anatomical region within the middle ear cavity 44.

Thus, in some embodiments, the steerable tool 20 is extended through (e.g., moved axially relative to) the inner lumen of the rigid cannula third flexible tube 17, projecting out of the opening formed by the distal end 19 of the third flexible tube 17 in a direction 37, through the entrance 53 of the middle ear cavity 44, and into the middle ear cavity 44. Then, the steerable tool 20 is actuated to form a bend as discussed above, such that the distal end 22 of the steerable tool 20 is steered in two or more directions in order to advance toward an anatomical region within the middle ear cavity 44. For example, FIG. 15 depicts the distal end 22 being steered in a first circumferential direction 33 relative to an axis 34 defined by the distal end 19 of the third flexible tube 17. As another example, FIG. 16 depicts the distal end 22 being steered in a second circumferential direction 39 relative to the axis 34.

Figure 17:
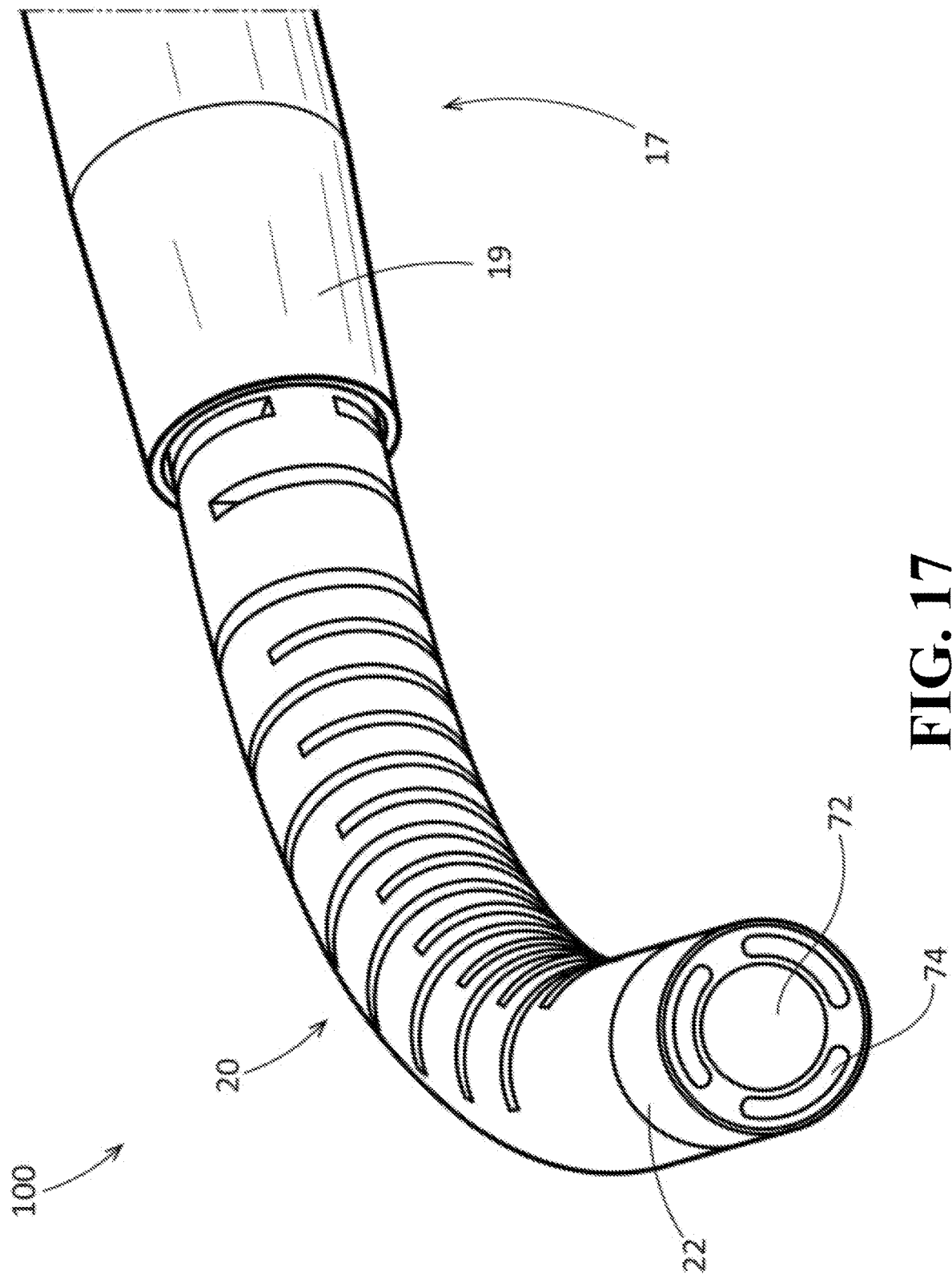
FIG. 17 is a detailed perspective view of a steerable tool of the tube assembly of FIG. 10, according to some embodiments of the present disclosure.

Referring now to FIG. 17, the steerable tool 20 is shown in greater detail, according to some embodiments of the present disclosure. As discussed above, the steerable tool 20 may be actuated to form a bend in order to steer the distal end 22 of the steerable tool 20. The steerable tool 20 may be flexible enough to traverse the pre-curved portion 14 of the rigid tube 12 without incurring material yield. The steerable tool 20 may have an outer diameter of equal to or less than one-and-three-fifths millimeters, in order to pass through the inner lumen of the third flexible tube 17. In further embodiments, the outer diameter of the steerable tool 20 at its region configured to enter and/or pass through the third flexible tube 17 is between about one millimeter and about two millimeters. In further embodiments, the outer diameter of the steerable tool 20 at its region configured to enter and/or pass through the third flexible tube 17 is dimensioned to correspond to the anatomical dimension of the Eustachian tube, which may vary from patient to patient. The steerable tool 20 may be long enough in order to project out of the opening formed by the distal end 19 of third flexible tube 17 by between about twenty millimeters and about thirty millimeters in some embodiments, thus enabling the distal end 22 of the steerable tool to be steerable to the various dimensional extents defined by the middle ear cavity 44.

As mentioned above, the steerable tool 20 may include two or more sections, including the steerable section 71 and the transmission section 73, which may include a flexible section 75 and a rigid section 77. In some embodiments, particularly in situations for middle ear access, compliance in the flexible section 75 may be achieved from fabricated patterns onto medical tubing or from using a more flexible/compliant material to construct the flexible section 75, as compared to the rigid section 77. For instance, the flexible section 75 may be compliant in bending in order to allow the steerable tool 20 to pass through the pre-curved portion 14 of the rigid tube 12. Additionally, the rigid section 77 may be used as a rigid end on which a linear force may be applied to extend the steerable tool 20 through the inner lumen of the third flexible tube 17, and into the middle ear cavity 44. In some embodiments, the steerable tool 20 in its entirety may be long enough such that the rigid section 77 is movably located between the proximal portion 11 of the rigid tube 12 and any retainers or linear sliders featured on the actuator used to extend the steerable tool 20, such as the user interface 60 discussed above. In other words, the rigid section 77 may be movably located within the apparatus 100, without being required to navigate the pre-curved portion 14 of the rigid tube 12.

In some embodiments of the apparatus 100 as configured for middle ear access, the tube assembly 10 includes the image sensor assembly 102 disposed within the steerable tool 20 as discussed above. Alternatively, and as shown, the steerable tool 20 may include a tool assembly 70 located on or about the distal end 22 of the steerable tool 20.

In some embodiments, the tool assembly 70 may include a digital image and/or video sensor 72 mounted to the distal end 22. The image and/or video sensor 72 may capture images of an area around the middle ear cavity 44, such as the cholesteatoma 49 depicted with reference to FIG. 11. The image and/or video sensor 72 may be regular camera, a thermal camera, or both. In some embodiments, the image and/or video sensor 72 is configured similar to the image sensor 114, and may thus be a CMOS image sensor.

In some embodiments, the tool assembly 70 may include one or more light sources 74 mounted to the distal end 22. The one or more light sources 74 may be light-emitting diode ("LED") light sources, a lamp, or fiber optic light sources, for example. In some embodiments, the light sources 74 may be configured similar to the one or more light sources 116 as discussed above.

In some embodiments, the distal end 22 further includes an opening to facilitate the passage of other secondary tools for therapeutic purposes within the middle ear cavity 44. Accordingly, the distal tool assembly 70 may include any appropriate tools at the distal end 22 in order to perform the methods described herein. The steerable tool 20 may include an inner lumen through which any wirings, controls, etc. necessary for the function of the tool assembly 70, may extend.

Figure 18:
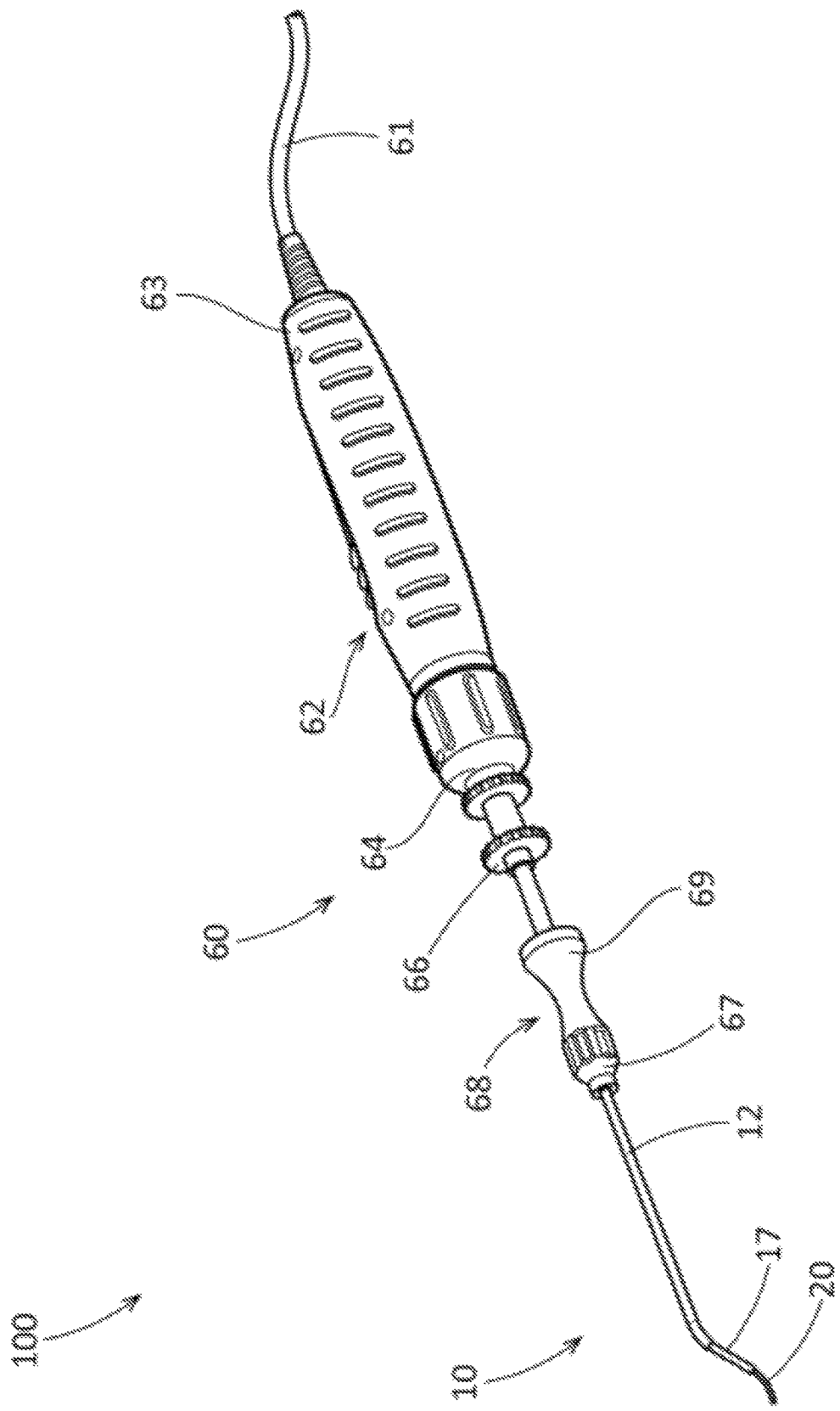
FIG. 18 is a perspective vie of a user interface of an endoscopic apparatus for middle ear access coupled to a tube assembly of the endoscopic apparatus, according to some embodiments of the present disclosure.

Referring now to FIG. 18, the apparatus 100 is shown with the tube assembly 10 coupled to the user interface 60, according to some alternative embodiments of the present disclosure. For instance, the user interface 60 as shown may include some, all, or none of the components of the user interface 60 as described above with reference to FIGS. 8A-8E.

When coupled to the user interface 60, the tube assembly 60 may provide an apparatus for middle ear access that can be controlled by a user. As suggested above, the user interface 60 may be operated by a user in order to perform the actuation of the steerable tool 20 described herein. As shown, the tube assembly 10 may be coupled to a hub 68 (e.g., a distal mount of the user interface 60) at a proximal end of the tube assembly. For example, the proximal end 13 of the rigid tube 12 (as depicted with reference to FIG. 1) may be coupled to a distal end 67 of the hub 68. In some embodiments, a proximal end 69 of the hub 68 includes an opening in order to facilitate insertion of the third flexible tube 17 into the rigid tube 12. Thus, according to some embodiments, the apparatus 100 may be provided such that the third flexible tube 17 is fed into the rigid tube 12 from an external source (rather than being consistently present within the rigid tube 12 in a telescopic fashion). Similarly, the steerable tool may then be fed into the third flexible tube 17. In such embodiments, the third flexible tube 17 and/or the steerable tool 20 may be manually guided by the user in order to perform the staged deployment described herein. In other embodiments, the rigid tube 12, the third flexible tube 17, and the steerable tool 20 are consistently structured relative to one another in a telescopic fashion. In such embodiments, the user interface 60 includes various actuators that can be controlled by the user to extend the third flexible tube 17 and/or the steerable tool 20 in order to perform the staged deployment described herein.

In some embodiments, the user interface 60, particularly with reference to the handle 62 of the user interface 60, is configured as a controller that includes controls (e.g., buttons, switches, etc.) for commanding (e.g., sending control signals for) the function of the tube assembly 10. For example, the user interface 60 may include components for the stabilization of the tube assembly 10, the axial rotation of the tube assembly 10, the advancement/retraction of the third flexible tube 17 and/or steerable tool 20, deflection (e.g., steering) of the steerable tool 20, and/or operation of any components mounted to the steerable tool 20 (e.g., the tool assembly 70, including the image and/or video sensor 72 and/or the one or more light sources 74) throughout a procedure for accessing the middle ear cavity 44 or other anatomical regions. The user interface 60 may be configured to provide one or more control signals to one or more actuators in order to do so. As an example, the user interface 60 may include a linear actuator 66 for advancement and/or retraction of the third flexible tube 17 relative to the rigid tube 12 (e.g., the second stage of deployment as depicted above with reference to FIG. 5), as well as advancement and/or retraction of the steerable tool 20 relative to the third flexible tube 17 (e.g., the third stage of deployment as depicted above with reference to FIG. 6). As another example, the user interface 60 may include a steerable tool actuator 64 to control the deflection of the steerable tool 20 as described above with reference to FIGS. 9C-9D. As yet another example, the handle 62 itself may be rotated in order to rotate the tube assembly 10 in its entirety. As discussed above, the steerable tool 20 may be implemented in a fashion that allows for bi-directional bending. In order to provide a full spectrum of steerable control of the distal end 22 of the steerable tool 20, rotation of the steerable tool via the user interface 60 may thus be required.

In some embodiments, the steerable tool actuator 64 incorporates mechanical stops to prevent over-actuation of the steerable tool (e.g., pushing and/or pulling on the first flexible tube 28 and/or the second flexible tube 23 to a point that might incur material damage to the steerable tool 20). In some embodiments, the function of the steerable tool actuator 64 is non-backdrivable or incorporates a mechanism which is engaged in order to prevent the steerable tool 20 from automatically returning to its neutral (straight) position (e.g., the configuration of the steerable tool 20 depicted with reference to FIG. 6B). The user interface 60 may incorporate markings or fiducial features to aid the user in registering the position and deflection of the steerable tool 20 as it is advanced through the anatomy of the patient (e.g., into the nasal passageway 40, the Eustachian tube 42, and into the middle ear cavity 44). The user interface 60 may be battery-powered or, in some embodiments, include a cable 61 coupled to a proximal end 63 of the user interface 60 in order to provide power for the actuation described above.

In some embodiments, the proximal end 63 of the handle includes a port for any external cabling associated with the tool assembly 70 (e.g., any cabling that is not typically located within the user interface 60 for typical use). In some embodiments, the user interface 60 includes buttons for control of the tool assembly 70. For example, the user interface 60 may include buttons for control of the image and/or video sensor 72 and/or the one or more light sources 74 including, but not limited to, brightness level, white balance, picture capture, and autogain.

Figure 19:
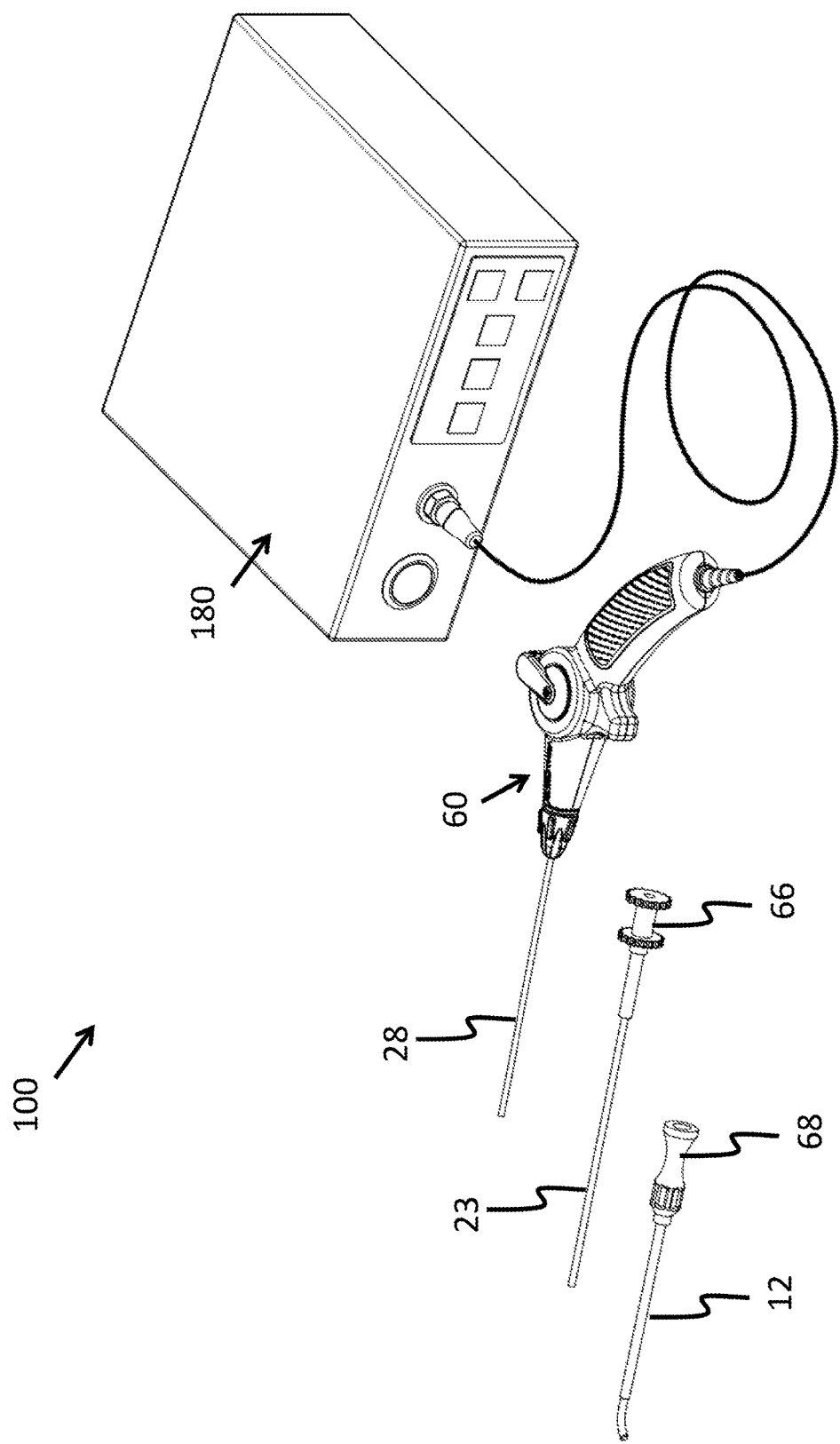
FIG. 19 is a perspective view of an endoscopic apparatus for middle ear access including a tube assembly coupled to a user interface, which is coupled to a control unit, according to some embodiments of the present disclosure.

Referring now to FIG. 19, the apparatus 100 configured for middle ear access is shown to include the external control unit 180 as discussed above, according to some embodiments of the present disclosure. Thus, the external control unit 180 may interface with the various components of the user interface 60 in the context of providing middle ear access. Additionally as shown, the user interface 60 as described above with reference to FIGS. 8A-8E may be configured to be retrofitted with various components in order to perform the methods of middle ear access discussed herein. For instance, the hub 68 may be provided as coupled to the rigid tube 12 (with the third flexible tube 17 disposed therein), and may be assembled to the linear actuator 66 as coupled to the second flexible tube 23, and the aforementioned components may be assembled to the actuator 60 as coupled to the first flexible tube 28.

Thus, although there have been described particular embodiments of the present invention of a new and useful METHOD AND APPARATUS FOR ENDOSCOPY, it is not intended that such references be construed as limitations upon the scope of this invention.

What is claimed is:

1. An endoscopic apparatus, comprising:
a steerable tool including a first flexible tube concentrically nested within a second flexible tube;
an image sensor disposed on the steerable tool;
one or more light sources disposed on the steerable tool; and
a user interface,
wherein the first flexible tube includes a first deflectable portion, the second flexible tube includes a second deflectable portion, the first and second deflectable portions being selectively weakened portions of the first and second flexible tubes that are angularly oriented, relative to a longitudinal axis of the steerable tool, in directions that are offset from each other by an angle equal to or less than one-hundred and eighty degrees,
wherein the steerable tool is actuable to form a bend by relative axial translation between the first flexible tube and the second flexible tube,
wherein a proximal end of the steerable tool is secured to the user interface, and
wherein the user interface is a handle that includes:
a lever; and
a mechanical transmission that converts a rotary motion of the lever to linear translation between the first flexible tube and the second flexible tube, such that the steerable tool is actuated to form the bend.

2. The apparatus of claim 1, wherein the image sensor comprises a digital complementary metal oxide semiconductor (CMOS) image sensor.

3. The apparatus of claim 1, wherein the first and second deflectable portions each include material removed from the first and second flexible tubes, such that remaining material of each of the first and second tubes have a serpentine profile.

4. The apparatus of claim 1, wherein the first and second deflectable portions each include a series of cutout sections spaced along the longitudinal axis of the steerable tool.

5. The apparatus of claim 1, further comprising an external control unit, wherein the external control unit includes a power source configured to supply power to the image sensor and the one or more light sources.

6. The apparatus of claim 1, further comprising an end cap disposed on the steerable tool,
wherein the image sensor is disposed on the end cap, and
wherein the one or more light sources are disposed on the end cap.

7. An endoscopic apparatus, comprising:
a steerable tool including a first flexible tube concentrically nested within a second flexible tube;
a third flexible tube, wherein the steerable tool is disposed within and axially movable relative to the third flexible tube;
a rigid tube, wherein the third flexible tube is disposed within and axially movable relative to the rigid tube;
an image sensor disposed on a distal end of the steerable tool;
one or more light sources disposed on the distal end of the steerable tool; and
a user interface,
wherein the first flexible tube includes a first deflectable portion, the second flexible tube includes a second deflectable portion, the first and second deflectable portions being selectively weakened portions of the first and second flexible tubes that are angularly oriented, relative to a longitudinal axis of the steerable tool, in directions that are offset from each other by an angle equal to or less than one-hundred and eighty degrees, and
wherein the steerable tool is actuable to form a bend by axial translation between the first flexible tube and the second flexible tube,
wherein a proximal end of the steerable tool is secured to the user interface, and
wherein the user interface is a handle that includes:
a lever; and
a mechanical transmission that converts a rotary motion of the lever to relative linear translation between the first flexible tube and the second flexible tube, such that the steerable tool is actuated to form the bend.

8. The apparatus of claim 7, wherein the rigid tube is a cannula having a pre-formed curvature that forms an angle between a first axis defined by a distal portion of the rigid tube and a second axis defined by a proximal portion of the rigid tube,
wherein the angle is between about one-hundred and ten degrees and about one-hundred and sixty degrees, and
wherein the third flexible tube is a catheter.

9. The apparatus of claim 8, wherein the image sensor is a digital complementary metal oxide semiconductor (CMOS) image sensor.

10. The apparatus of claim 9, wherein the first and second deflectable portions each include material removed from the first and second flexible tubes, such that remaining material of each of the first and second tubes have a serpentine profile.

11. The apparatus of claim 9, wherein the first and second deflectable portions each include a series of cutout sections spaced along the longitudinal axis of the steerable tool.

12. The apparatus of claim 7, further comprising an external control unit, wherein the external control unit includes a power source configured to supply power to the image sensor and the one or more light sources.

13. A method of accessing a region within a middle ear cavity of a patient, comprising:

providing a steerable tool, the steerable tool including a first flexible tube concentrically nested within a second flexible tube;

providing at least a portion of a rigid tube within a nasal passageway that interfaces with the middle ear cavity via a Eustachian tube intermediate the nasal passageway and the middle ear cavity;

extending a third flexible tube through an inner lumen of the rigid tube, such that at least a portion of the third flexible tube projects out of an opening formed by a distal end of the rigid tube, and a distal end of the third flexible tube is displaced along the Eustachian tube toward the middle ear cavity;

extending the steerable tool through an inner lumen of the third flexible tube, such that at least a portion of the steerable tool projects out of an opening formed by the distal end of the third flexible tube, and a distal end of the steerable tool is positioned within the middle ear cavity; and actuating the steerable tool to form a bend, such that the distal end of the steerable tool is steered toward the region within the middle ear cavity, wherein a proximal end of the steerable tool is secured to a user interface, and wherein the user interface is a handle that includes:
  a lever; and
    a mechanical transmission that converts a rotary motion of the lever to relative linear translation between the first flexible tube and the second flexible tube, such that the steerable tool is actuated to form the bend.

14. The method of claim 13, wherein the rigid tube is a cannula having a pre-formed curvature that forms an angle between a first axis defined by a distal portion of the rigid tube and a second axis defined by a proximal portion of the rigid tube,
  wherein the angle is between about twenty degrees and about seventy degrees, and
  wherein the third flexible tube is a catheter.

15. The method of claim 14, further comprising:
  providing an image sensor disposed on the distal end of the steerable tool; and
  providing one or more light sources disposed on the distal end of the steerable tool.

16. The method of claim 15, wherein an outer diameter of the third flexible tube is equal to or less than about three millimeters.

17. The method of claim 14, wherein an outer diameter of the steerable tool is equal to or less than about one-and-three-fifths millimeters.

18. The method of claim 17, wherein the at least a portion of the steerable tool is configured to project out of the opening formed by the distal end of the third flexible tube by between about twenty millimeters and about forty millimeters during actuation of the steerable tool.

* * * * *